US012728362B2

(12) United States Patent
Goetgeluk et al.

(10) Patent No.: US 12,728,362 B2
(45) Date of Patent: Sep. 8, 2026

(54) OMNIDIRECTIONAL LOCOMOTION SYSTEM WITH FULL RANGE OF MOTION IN MULTIPLE DEGREES OF FREEDOM FOR WALKABLE OR INTERACTIVE VIRTUAL REALITY

(71) Applicant: VIRTUIX HOLDINGS INC., Austin, TX (US)

(72) Inventors: Jan Goetgeluk, Austin, TX (US); James Douglas Shuffield, Cedar Park, TX (US); Ronald Kurt Bender, Dripping Springs, TX (US); David Hernandez, Austin, TX (US); Cameron Slayter, Austin, TX (US)

(73) Assignee: Virtuix Holdings Inc., Austin, TX (US)

(*) Notice: Subject to any disclaimer, the term of this patent is extended or adjusted under 35 U.S.C. 154(b) by 467 days.

(21) Appl. No.: 18/028,527

(22) PCT Filed: Sep. 25, 2021

(86) PCT No.: PCT/US2021/052109
§ 371 (c)(1),
(2) Date: Mar. 25, 2023

(87) PCT Pub. No.: WO2022/067139
PCT Pub. Date: Mar. 31, 2022

(65) Prior Publication Data

US 2023/0356099 A1 Nov. 9, 2023

Related U.S. Application Data

(60) Provisional application No. 63/083,716, filed on Sep. 25, 2020.

(51) Int. Cl.
*A63G 31/16* (2006.01)
*G06F 3/01* (2006.01)

(52) U.S. Cl.
CPC .............. *A63G 31/16* (2013.01); *G06F 3/011* (2013.01); *G06F 2203/012* (2013.01)

(58) Field of Classification Search
CPC ... A63G 31/16; G06F 3/011; G06F 2203/012; G06F 3/016; G06F 3/0346
See application file for complete search history.

(56) References Cited

U.S. PATENT DOCUMENTS 3,539,053 A * 11/1970 Hefferin ................ F16D 55/228 192/225
4,494,177 A * 1/1985 Matthews ............... F21V 21/26 362/402

(Continued)

FOREIGN PATENT DOCUMENTS

WO WO-2020159020 A1 * 8/2020 .......... B25J 19/0004

*Primary Examiner* — Oschta I Montoya
(74) *Attorney, Agent, or Firm* — Polsinelli PC

(57) ABSTRACT

An omnidirectional locomotion system that can be used with virtual reality (VR) environment technology includes at least a base portion, an articulating arm extending upward from a platform of the base portion, and a rotation mechanism rotatably coupling the base portion to the articulating arm. The platform of the base portion is configured to support a user and the articulating arm can include a harness support configured to attach to a harness worn by the user. The articulating arm comprises at least a first link, a second link, and a hinged joint coupled between the first link and the second link. The rotation mechanism can permit the articulating arm to rotate through 360-degrees around an outer circumference of the base portion; the hinged join can permit the articulating arm to translate horizontally or vertically with respect to the base portion.

20 Claims, 15 Drawing Sheets

(56) References Cited

U.S. PATENT DOCUMENTS

| | | | | |
|---|---|---|---|---|
| 5,448,148 | A * | 9/1995 | Devier | G05B 19/404 318/645 |
| 6,535,794 | B1 * | 3/2003 | Raab | B25J 9/1692 700/262 |
| 7,979,160 | B2 * | 7/2011 | Teaford | B25J 9/1641 700/254 |
| 2004/0169434 | A1 * | 9/2004 | Washington | H01R 39/24 310/232 |
| 2009/0256800 | A1 * | 10/2009 | Kaufman | G06F 3/011 715/700 |

* cited by examiner

OMNIDIRECTIONAL LOCOMOTION SYSTEM WITH FULL RANGE OF MOTION IN MULTIPLE DEGREES OF FREEDOM FOR WALKABLE OR INTERACTIVE VIRTUAL REALITY

CROSS-REFERENCE TO RELATED APPLICATIONS

This application is a national stage application of International Application No. PCT/US2021/052109, which was filed on Sep. 25, 2021, which claims priority to U.S. Provisional Application No. 63/083,716 filed Sep. 25, 2020 and entitled "OMNIDIRECTIONAL LOCOMOTION SYSTEM WITH FULL RANGE OF MOTION IN MULTIPLE DEGREES OF FREEDOM FOR WALKABLE OR INTERACTIVE VIRTUAL REALITY," the disclosures of which are herein incorporated by reference in their entireties.

TECHNICAL FIELD

The present disclosure pertains to an omnidirectional locomotion system and apparatus that can be used to provide an immersive virtual reality experience and more particularly relates to an omnidirectional locomotion system providing a full and natural range of motion in multiple degrees of freedom.

BRIEF DESCRIPTION OF THE DRAWINGS

In order to describe the manner in which the features of the disclosure can be obtained, a more particular description of the principles briefly described above will be rendered by reference to specific examples thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Figure 1:
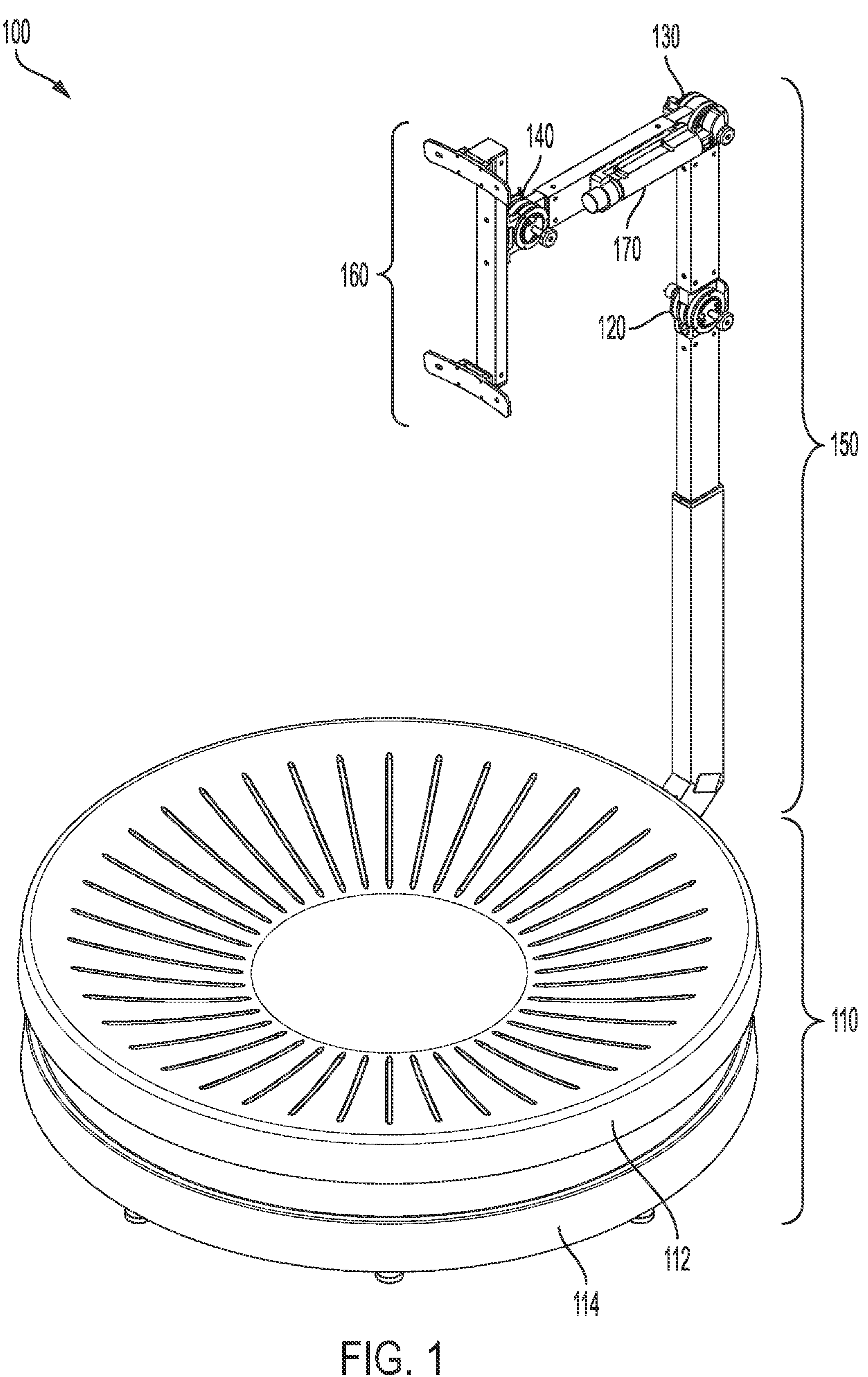
FIG. 1 is a perspective view of an example omnidirectional locomotion system according to one or more aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

Disclosed herein are omnidirectional locomotion systems and apparatuses that provide users with a full and natural range of motion (ROM) in multiple degrees of freedom (DOF), thereby providing a fully immersive and more natural virtual reality (VR) experience to users. Although the following discussion makes reference to examples in which the presently disclosed omnidirectional locomotion systems and apparatuses are used for VR experiences, it is appreciated that this is for purposes of clarity and illustration and is not intended to be construed as limiting. For example, it is contemplated that the omnidirectional locomotion systems and apparatuses can additionally or alternatively be used in the context of augmented reality (AR) experiences, traditional gaming experiences, and/or non-gaming interactive experiences, etc.

Overview

FIG. 1 illustrates a perspective view of an example omnidirectional locomotion system 100 (also referred to herein as an "omnidirectional platform"). Omnidirectional locomotion system 100 includes a base portion 110, an articulating arm portion 150, and a coupling portion 160 (also referred to herein as a "spine portion"), each of which will be explained in greater depth below.

In operation, a user may stand on a platform 112, shown here as a concave platform although other geometries, both curved and flat, can be utilized without departing from the scope of the present disclosure. As illustrated, platform 112 and base frame 114 are vertically separated from one another but remain rigidly affixed such that there is no relative rotation between the two. In some embodiments, a central hub or bearing can provide the rigid affixation between platform 112 and base frame 114 (see, e.g., FIGS. 6A and 6B).

The articulating arm portion 150 can extend radially through the area of vertical separation (i.e., the gap) between platform 112 and base frame 114. A first distal end of articulating arm portion 150 can be coupled to a rotatable element of the aforementioned central hub or bearing, such that articulating arm 150 can rotate freely through a full 360° of rotation with respect to a reference or ground plane. In some embodiments, the reference ground plane can be given by base portion 110, platform 112, and/or base frame 114. A second distal end of articulating arm portion 150 is coupled to the spine portion 160, e.g., at a rotating joint 140. As illustrated, articulating arm 150 includes three rotating joints (also referred to herein as "revolute joints" and/or "hinge joints")—a first rotating joint 120, a second rotating joint 130, and a third rotating joint 140—each of which will be described in greater depth below. However, it is appreciated that a greater or lesser number of rotating joints can be utilized without departing from the scope of the present disclosure. For example, in some embodiments a single rotating joint can be utilized, e.g., provided at or near the location where the articulating arm 150 meets the base portion 110. As another example, in some embodiments, two rotating joints can be utilized, e.g., the rotating joints 120 and 130, with the functionality of third rotating joint 140 instead provided by an alternate mechanism such as a sliding rail mechanism upon which the vest is mounted to permit vertical movement of spine assembly 160 and a user.

The user's body or torso can be coupled to omnidirectional locomotion system 100 by a vest or harness worn over the chest/shoulders (not shown). In some embodiments, the user can additionally or alternatively be coupled to omnidirectional locomotion system 100 via a belt, hip harness, or other attachment means that contact the user at or about the user's waist and/or hips. In such scenarios in which a hip belt, hip harness, etc., are utilized, it is contemplated that the hip belt can be used as a sole attachment means (e.g., without a vest or torso harness), a primary attachment means, and/or a secondary attachment means (e.g., used in combination with a vest or torso harness). In particular, the vest or other attachment mechanism can be mounted to spine portion 160, such that a user wearing the vest is coupled to both spine assembly 160 and the articulating arm 150. Based on various combinations of the 360° rotation permitted by base portion 110 and the multi-point articulation permitted by the three rotating joints 120, 130, 140 and the linkage of articulating arm 150, omnidirectional locomotion system 100 allows users to perform actions that include, but are not limited to, running, jumping, crawling, squatting, bending, etc., over the full 360° of rotation. Unlike conventional approaches to providing locomotion for use in or with virtual reality experiences, the presently disclosed full-ROM omnidirectional locomotion system can, in at least some embodiments, avoid the use of physical supports, restraints, or other "real world" hindrances that can severely reduce a user's ability to feel fully immersed in a virtual reality world. In particular, in some embodiments the articulating arm 150 can be viewed as a follower-type linkage—the links and revolute joints 120, 130, 140 are repositionable such that the user's movement (coupled to articulating arm 150 via spine assembly 160 and a vest/harness attached to the user's torso) drives the linkage and causes articulating arm 150 to "follow" the movements of the user.

Advantageously, compared to conventional solutions for translating real world locomotion into movement within a virtual reality world, the presently disclosed omnidirectional locomotion system allows users to change their direction of movement naturally, e.g., by rotating their hips and torso to walk or run in the desired direction. Existing solutions largely approach the problem of controlling direction of locomotion by setting the direction of locomotion to be the same as (or otherwise corresponding to) the direction of the user's gaze within the virtual reality world. That is, existing solutions require a user to 'look' left in order to walk left, whereas the presently disclosed omnidirectional locomotion system allows a user to walk left by simply turning their body to the left, just as they would do in the real world. Not only is this approach more natural and immersive, but it is also more robust in terms of permitted interaction dynamics within the virtual reality environment—a user can walk to the left while looking over his shoulder (i.e., to the right), an ability that is particularly valuable, for example, in first person shooter and other open world games, where action is often concentrated in areas besides directly in front of the user.

Example Omnidirectional Locomotion System

The disclosure returns now to further details relating to the example omnidirectional locomotion system 100 depicted in FIG. 1. As used herein, the terms "upper assembly" and/or "arm assembly" are understood to indicate the combination of at least articulating arm 150 and spine 160 of the omnidirectional locomotion system 100. As mentioned previously, in operation, a user stands on a fixed platform 112 that is included within base portion 110. Platform 112 is shown here as being concave circular in shape, with a flattened circular depression at its center. Platform 112 does not move with respect to the ground plane, i.e., the environment in which omnidirectional locomotion system 100 is located. Instead, platform 112 and base frame 114 are rigidly coupled to one another, for example via a central hub or bearing, further details of which can be seen in FIGS. 6A-7B.

The central hub or bearing can be designed to provide a vertical separation or clearance between the bottom surface of platform 112 and the top surface of base frame 114. The first distal end of articulating arm portion 150 can be received within the resulting gap and coupled to a rotatable portion of the same central hub or bearing that rigidly affixes platform 112 to base frame 114. The vertical separation between platform 112 and base frame 114 can be sized to permit articulating arm 150 to rotate through a full 360° range without interfering (e.g., colliding) with either platform 112 or base frame 114 at any point along the rotation path.

In some embodiments, a user's body or torso can be coupled to the articulating arm 150 by a vest or harness. For example, a vest can be worn over the chest/shoulders and secured with one or more attachment mechanisms, which can include straps, buckles, Velcro, clasps, buttons, etc. In some embodiments, the vest can include a waist or hip belt and/or a sternum strap. The vest can be mounted to spine portion 160, such that a user wearing the vest is coupled to both spine portion 160 and the articulating arm portion 150. Based on various combinations of the 360° rotation (e.g., permitted by base portion 110) and the multi-point articulation (e.g., permitted by the three rotating joints 120, 130, 140), as the user changes his or her direction of locomotion, the articulating arm 150 will also rotate or otherwise move with the user.

In other words, as a user rotates or changes angular position with respect to the fixed base platform 112, the spine 160 and articulating arm 150 synchronously rotate with the user—the spine and arm remain "behind" the user's back, in the same relative position as when the user first stepped onto the omnidirectional locomotion system and initially put on the vest. Details of the central hub/bearing that is coupled to articulating arm 150 and permits full 360° rotation will be subsequently discussed with reference to FIGS. 6A-7B.

Similarly, as a user jumps, crouches, or changes vertical position with respect to the fixed base platform 112, the spine assembly 160 synchronously moves with the user to match the vertical change—once again, the spine and arm remain "behind" the user, as the three hinge joints 120, 130, 140 rotate to permit articulating arm 150 to achieve the appropriate position. Details of hinge joints 120, 130, 140 and various other components and mechanisms that can enable movement(s) of articulating arm 150 will be subsequently discussed with respect to FIGS. 2A-5.

Although not shown, in some embodiments it is contemplated that the spine assembly 160 can be attached to the articulating arm 150 via a movable truck that slides along one or more rails. In such a configuration, the coupling or attachment between spine assembly 160 and the movable truck(s) can permit the spine assembly 160 (and consequently, a user wearing a vest or other harness coupled to the spine assembly) to move vertically together. Similar to as was described above, in some examples a spine assembly having a movable truck assembly can be configured such that the spine assembly does not exert any undesired force(s) to oppose the user's natural motion or vertical movements. In some embodiments, the spine assembly can apply an adjustable opposing force by design—for example, the adjustable opposing force can be adjusted or modulated to suit user preferences and/or skill level.

In some embodiments, the three hinge joints 120, 130 and 140 can each be associated with separate spring/damping forces, e.g., provided by one or more corresponding mechanisms at or on the hinge joint. Additionally, the three hinge joints 120, 130, 140 can each be associated with a unique range of motion or angular rotation, which can be defined with respect to a default position of the hinge joint. In other words, each hinge joint can have a constrained single degree of freedom (DOF). In some embodiments, the configuration of FIG. 1 corresponds to default positions of the three hinge joints 120, 130, 140.

For example, the first hinge joint 120 can have a default position that is substantially vertical, e.g., such that articulating arm 150 is perpendicular to the ground plane and base portion 110 (in other words, the default position of first hinge joint 120 corresponds to an angle of ~0° between the upper and lower links of articulating arm 150 that are coupled to first hinge joint 120). Similarly, the second hinge joint 130 can have a default position that is substantially horizontal, e.g., such that the connected links of articulated arm 150 form an approximately 90° angle at second hinge joint 130 in its default position. The third hinge joint 140 can have a default position that is also substantially horizontal, such that the angle of the connection between spine assembly 160 and the upper link of articulated arm 150 is approximately 0°. In some embodiments, the spring/damping forces provided at or about each of the three hinge joints 120, 130, 140 can be calibrated to balance the gravitational forces and torques acting on articulating arm 150 such that the three hinge joins 120, 130, 140 are held in default positions as shown in FIG. 1.

As the user changes his or her stance angle with respect to the ground plane and the fixed platform 112 of the omnidirectional locomotion system 100 (e.g., leans forward or backward, as might commonly occur when accelerating or decelerating while running), one or more of the three hinge joints 120, 130, 140 rotates as well. The rotational movement of the hinge joints 120, 130, 140 causes a corresponding adjustment in the geometry and relative positioning between the connected links of articulating arm 150, such that the adjustment in arm position matches or otherwise accommodates the combination of translational (horizontal and vertical) displacement and/or angular displacement of the spine assembly 160 coupled to the vest worn by the user. In other words, the three hinge joints 120, 130, 140 of articulated arm 150 allow the user to physically move forward and backward, up and down, rotate left or right, all while remaining within the diameter of fixed base platform 112. As mentioned previously, in some embodiments the articulating arm 150 can be viewed as a follower-type linkage—the links and revolute joints between the links are repositionable such that the user's movement drives the linkage of articulating arm 150 to "follow" the movements of the user (e.g., based on the coupling of the user's movement into articulating arm 150 via spine assembly 160 and the vest/harness worn by the user).

Accordingly, it is contemplated that articulating arm 150 can articulate or otherwise change position and/or configuration via corresponding rotational changes at one or more of the rotating hinge joints 120, 130, 140. Additionally, in some embodiments articulating arm 150 and/or one or more of the hinge joints 120, 130, 140 can articulate without exerting any undesired force(s) to oppose the user's natural motion or rotation while using the omnidirectional locomotion system 100. However, it is also contemplated that articulating arm 150 and/or one or more of the hinge joints 120, 130, 140 can be configured to provide a desired amount of resistance or oppositional force. For example, in some embodiments one or more springs, pistons, shocks, and/or other damping mechanisms can be utilized to balance the gravitational forces acting on the mass of articulating arm 150. As will be described in greater depth below, these springs and damping mechanisms can be provided at or integrated with one or more of the hinge joints 120, 130 and 140. In such scenarios, the spring and/or damping force(s) can be configured to substantially counteract or cancel the gravitational forces acting on articulating arm 150, e.g., such that the user does not perceive the weight of articulating arm 150 and is able to move more naturally while coupled to the articulating arm.

As an illustrative example, with spring and/or damping forces properly calibrated or adjusted for a given user (e.g., based on the user's height and/or weight), a user can stand at rest without feeling the weight of articulating arm 150 pressing down on his or her shoulders; similarly, a user can jump without having to provide the energy to also move the mass of articulating arm 150. In some embodiments, one or more spring and/or damping forces provided by or on articulating arm 150 can be user-adjustable to provide a resistance or oppositional force that is in excess of that needed to counteract the gravitational forces acting on the articulating arm 150. In some embodiments, one or more of the spring and/or damping forces mentioned above can be provided by torsion or clock springs, which provide a spring force that varies with the rotation or angular position of the spring. A shock damper can also be utilized, either alone or in combination with a spring or other damping mechanism. The shock damper can be linearly actuated, e.g., with a piston or internal rod that can be extended and retracted from a main body component of the shock damper. In some embodiments, as will be discussed in greater depth below, a shock damper can be provided in combination with a cam, such that the cam rotates with a hinge joint or other portion of the articulating arm 150 and interacts with the shock damper as an interface between the rotational motion of the articulating arm/hinge joint and the linear motion of the shock damper.

It is appreciated that various other spring and/or damping mechanisms can be utilized without departing from the scope of the present disclosure. For example, other spring and/or damping mechanisms can include, without limitation, linear and/or compression springs (which in some embodiments can be variable springs), gas shocks, etc. In some embodiments, damping or spring-like force can be provided by mechanisms other than mechanical springs. For example, one or more servos or electric motors could be utilized and controlled to provide resistance that matches or is otherwise equivalent to that which would be provided by one or more springs. Damping and spring-like forces can additionally, or alternatively, be provided by a magnetic mechanism (e.g., in which the strength of a magnetic field is increased or decreased in order to cause a corresponding increase or decrease in the resistance force exerted at a particular hinge joint or other location along articulating arm 150), by a rotary damper, etc. Regardless of the specific type or design of mechanism used to provide the spring and/or damping forces disclosed herein, it is further contemplated that such a mechanism can be configured to be user-adjustable, either manually or automatically. For example, user adjustment of spring and damping forces can be made in order to customize or better adapt the articulating arm 150 of omnidirectional locomotion system 100 to the size and/or weight of the user, in order to thereby provide a more consistent experience that is substantially independent of the user's body type.

In particular, user-adjustable spring and/or damping forces can be utilized as a safety or training mechanism as users become accustomed to the mechanics of using and moving on the omnidirectional locomotion system 100. For example, a greater opposing force can be provided corresponding to a 'beginner' setting, while a minimal or zero opposing force can be provided corresponding to an 'expert' setting. It is further contemplated that various other opposing forces can be provided or selected that fall between either of the two extremes mentioned above. Additionally, the user-adjustable opposing force(s) can be selected from amongst a plurality of pre-defined settings or levels and/or can be selected as specific points or values along a continuous interval. In some embodiments, one or more of the spring forces, damping forces and/or opposing forces described herein can be automatically controlled to implement a safety mechanism, such as by applying a braking force or a lockout/locking force at one or more of the hinge joints 120, 130 and 140. The automatic control and application of braking or locking forces at the hinge joints 120, 130, 140 can be implemented as a software or algorithmic-based sensing, monitoring and control approach; as a purely mechanical approach; and/or as a hybrid approach combining software and mechanical control approaches and elements, as will be described in greater depth below.

Additionally, one or more of the hinge joints 120, 130, 140 can include one or more sensors to detect an angle or angular position at that given hinge joint, e.g., such that the composite angular sensor readings from the three hinge joints 120, 130, 140 allows the current state or position of articulating arm 150 and spine assembly 160 to be determined in substantially real-time. For example, in the detailed perspective views of the upper arm assembly of omnidirectional locomotion system 100 as presented in FIGS. 2A and 2B, angular sensors 128, 138 and 148 are shown as being provided in association with hinge joints 120, 130 and 140, respectively. In some embodiments, one or more of the sensors can also detect or otherwise determine a force applied by the user either directly or indirectly, e.g., by calculating an applied force based on a rate of change in the angle of deflection and other known physical and mechanical qualities of the articulating arm 150 in its current configuration.

In some embodiments, it is also contemplated that the sensors 128, 138, 148 can received wired power and/or transmit sensor data over a wired connection, which can be integrally provided by omnidirectional locomotion system 100 and articulating arm 150. For example, one or more powered wires or connections can be integrated into the links of articulating arm 150 and/or one or more data-carrying wires or connections can be integrated into the links of articulating arm 150. In some embodiments, a single wire or connection can be used for both power delivery and data transmission. Whether a single wire or multiple wires are run through articulating arm 150, in some embodiments the wire(s) can be provided in a continuous run, e.g., passing through or contained within a hollow interior volume of each link of articulating arm 150 and additionally passing through or around the hinge joints 120, 130, 140. In some embodiments, flexible connectors can be provided to couple power and/or data-carrying wires through the hinge joints 120, 130, 140.

Although not shown, it is further contemplated that articulating arm 150 can be configured to provide power and/or bidirectional data connections to one or more components coupled along the arm (e.g., the one or more sensors 128, 138, 148 at the three hinge joints 120, 130, 140) as well as to one or more components coupled at the distal or terminal end of the arm, e.g., at spine assembly 160. For example, components coupled at or through spine assembly 160 for purposes of power and/or data transmission can include, but are not limited to, a vest or harness worn by the user (e.g., which may have various sensors, haptic feedback mechanisms, controller/accessory docking and charging ports, etc.) or another electronic device such as a VR headset or computer that is electrically or communicatively coupled to a port disposed on the spine assembly 160 or articulating arm 150. As will be explained in greater depth with respect to FIGS. 6A-7B, the fixed base frame 114 of omnidirectional locomotion system 100 can include a slip ring that connects the power and/or data transmission systems of articulating arm 150 to corresponding power and data transmission systems on the fixed base portion 114 (e.g., thereby permitting the free 360-degree rotation of articulating arm 150 that would otherwise not be possible if a wired connection were to be used between articulating arm 150 and fixed base frame 114.) With respect to articulating arm 150, in some embodiments one or more of aluminum, carbon fiber, fiberglass, and/or glass-filled plastic(s) can be utilized to form the arm. In some examples, internal and/or external wired power or data connections can be provided with articulating arm 150 at the time of construction of the arm.

In some embodiments, the upper assembly of articulating arm 150 and spine 160 can include one or more charging ports and/or stations that can distribute power to electronic devices using custom or standardized connectors (e.g., custom connectors for VR headsets, VR computing devices, VR controllers etc.; standardized plugs for mains electricity according to various national or international standards; USB connectors, etc.). It is also contemplated that the upper assembly (or some other location on the omnidirectional locomotion system 100) can provide a combined storage and charging functionality. For example, the upper assembly could include a compartment, receptacle, or other defined volume where a user can store a VR headset and/or VR hand controllers when not in use. Stored electronic devices could be charged wirelessly or through a wired connection. An indention or other receiving mechanism can be provided in the charging compartment to indicate a proper alignment for a user's VR devices to be stored and charged, particularly in the case where wireless charging is provided. The charging compartment can be integrated into omnidirectional locomotion system 100 in one or more of spine assembly 160, articulating arm 150, and/or base 110; alternatively, a charging compartment or charging module may be provided as an external or modular component that can be added to omnidirectional locomotion system 100 at a later time by a user.

Articulating Arm

Figure 2B:
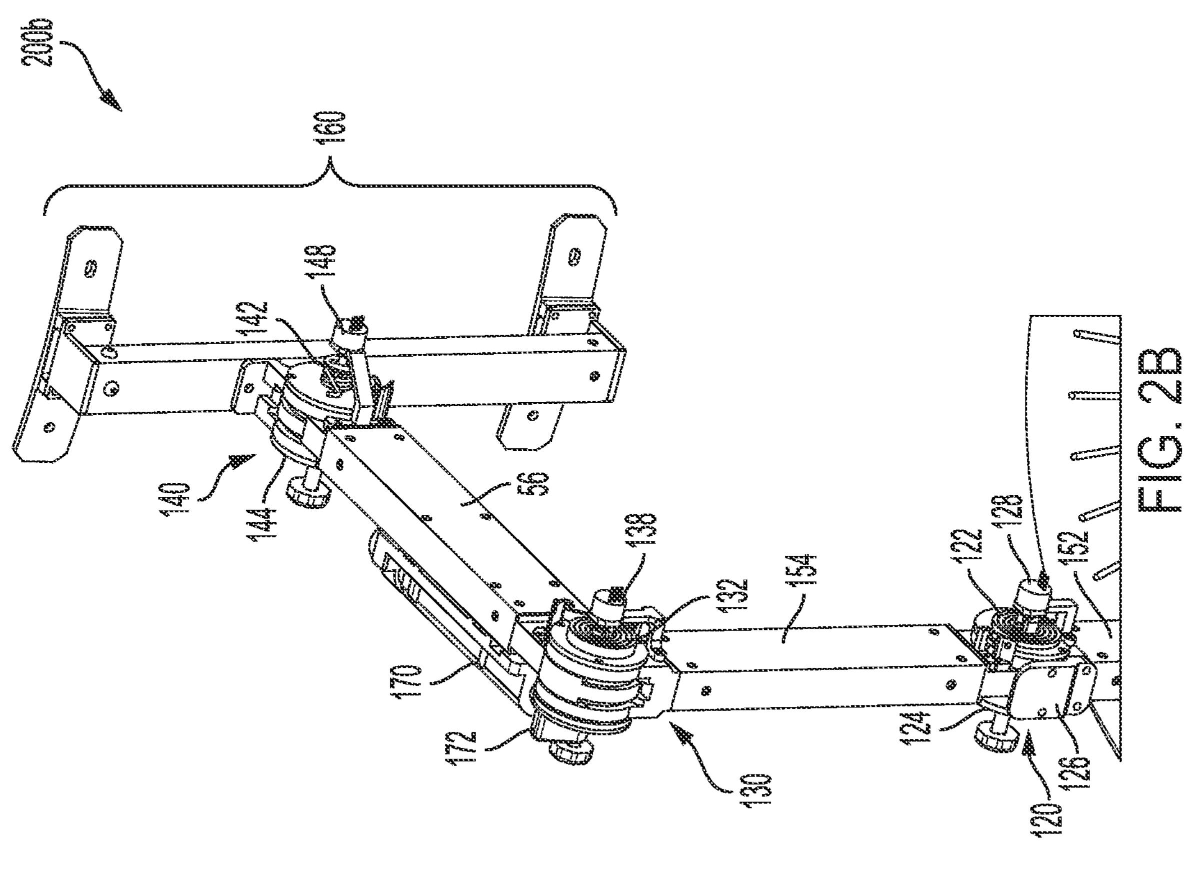
FIG. 2B is a second perspective view of an upper articulating arm assembly of an example omnidirectional locomotion system according to one or more aspects of the present disclosure.
Figure 2A:
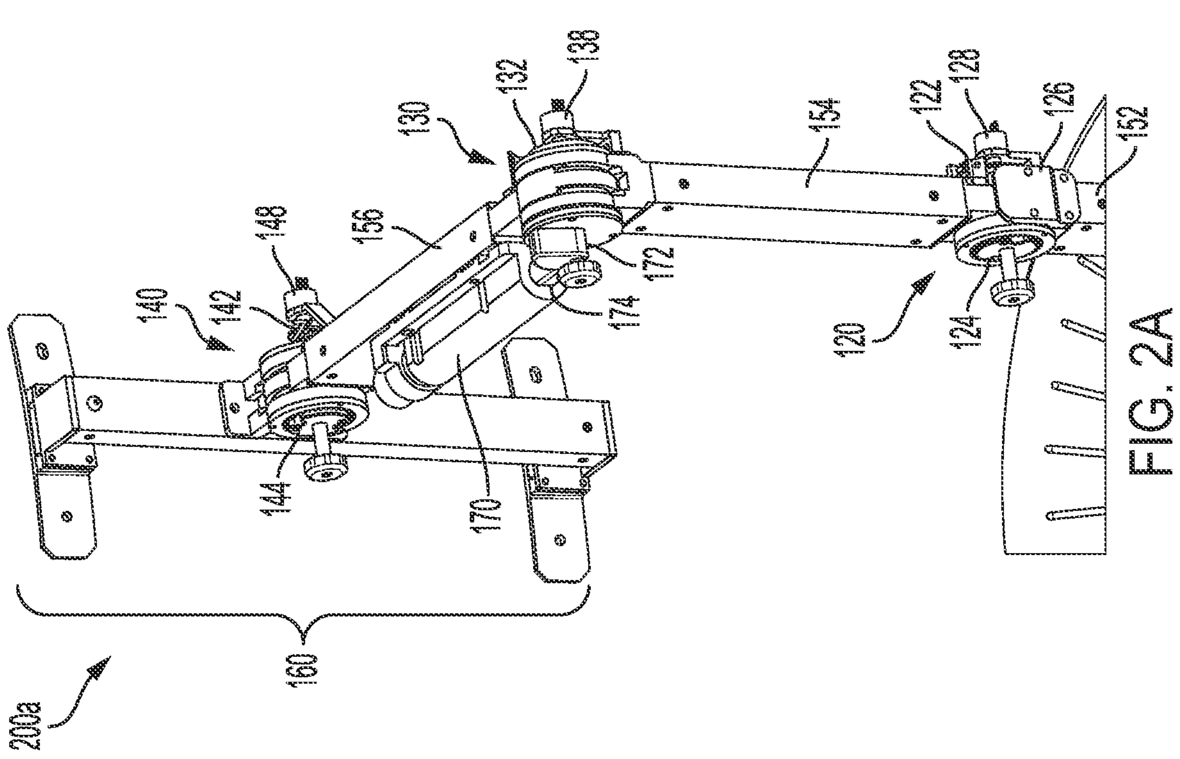
FIG. 2A is a first perspective view of an upper articulating arm assembly of an example omnidirectional locomotion system according to one or more aspects of the present disclosure.
Figure 3A:
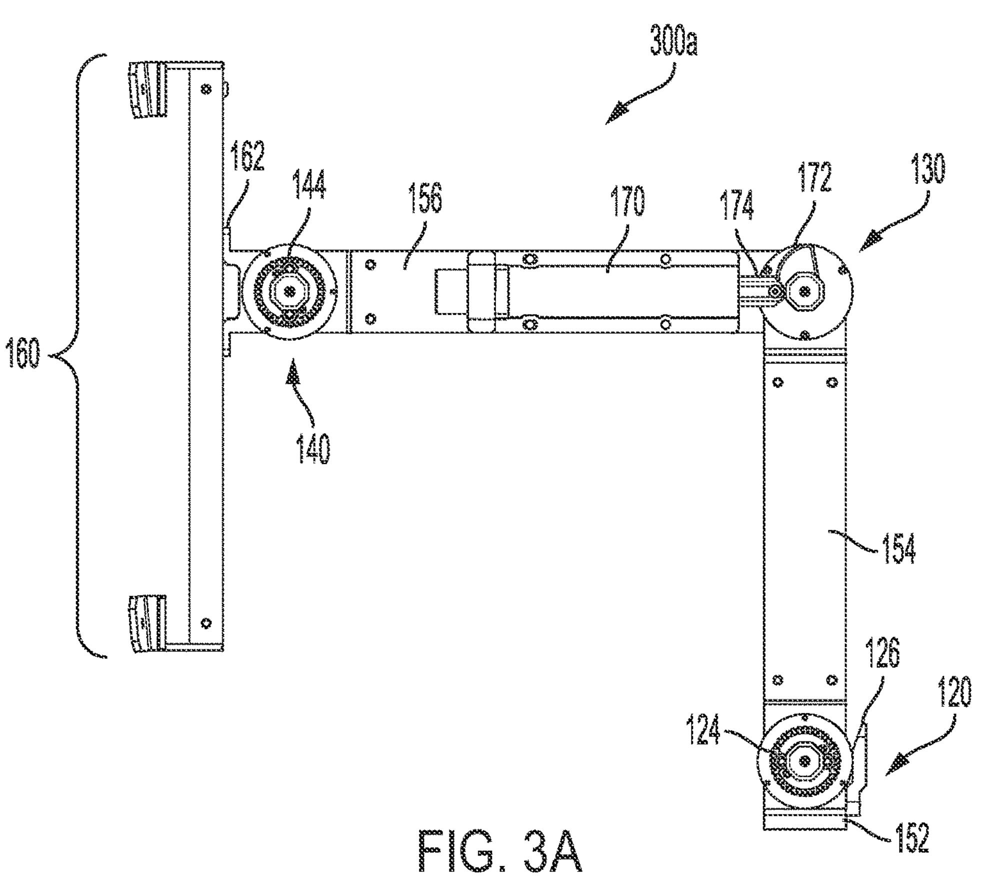
FIG. 3A is a first side view of an upper articulating arm assembly of an example omnidirectional locomotion system according to one or more aspects of the present disclosure.
Figure 3B:
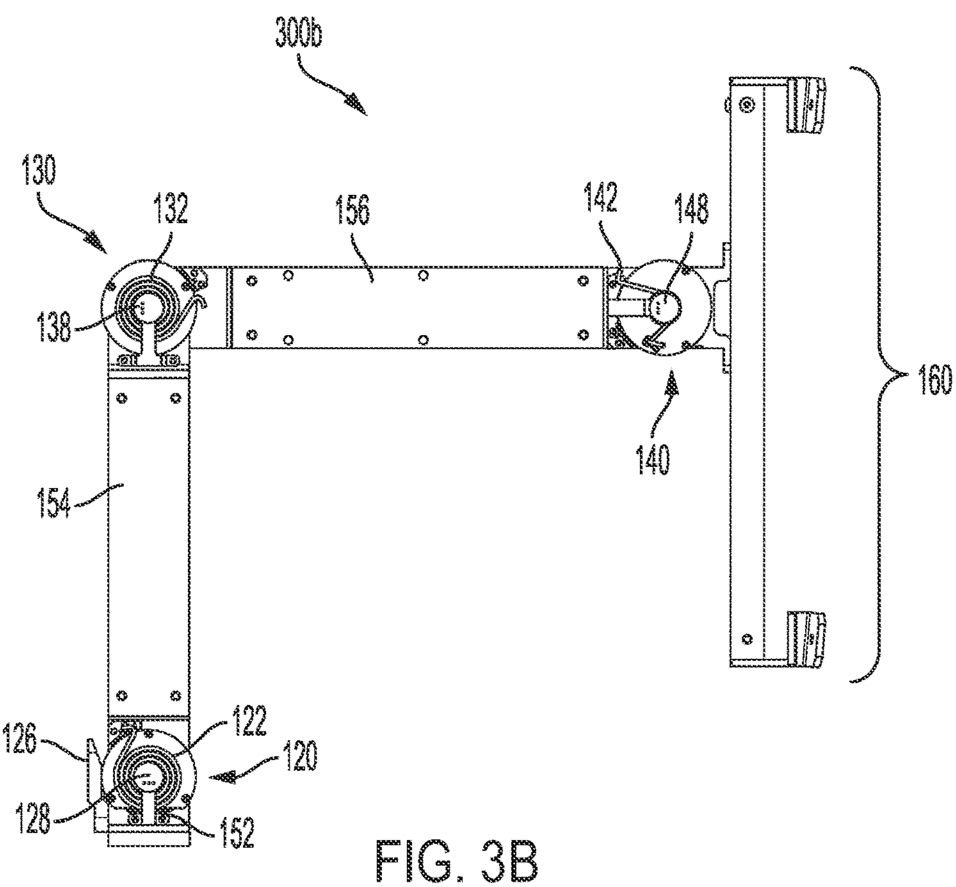
FIG. 3B is a second side view of an upper articulating arm assembly of an example omnidirectional locomotion system according to one or more aspects of the present disclosure.

FIGS. 2A and 2B present perspective views of an example omnidirectional locomotion system 200*a* and 200*b*, respectively, which in some embodiments can be the same as the example omnidirectional locomotion system 100 discussed previously with respect to FIG. 1. FIGS. 3A and 3B depict side profile views of the same example omnidirectional locomotion system, and it is noted that the following description is made with reference to FIGS. 2A-3B. A total of three hinge joints 120, 130 and 140 are shown as being provided on articulating arm 150, although it is appreciated that a greater or lesser number of hinge joints can be utilized without departing from the scope of the present disclosure.

First hinge joint 120 couples a fixed link 152 (connected at its other end to the central rotating hub of base portion 110 of the omnidirectional locomotion system 100) to an intermediate link 154. Fixed link 152 and intermediate link 154 are both links of articulating arm 150. In some embodiments, first hinge joint 120 has a default position such that an approximately 0-degree angle is maintained between fixed link 152 and intermediate link 154, e.g., as illustrated in FIGS. 2A and 2B. First hinge joint 120 includes a first spring mechanism 122, shown here as a clock spring, although it is noted that other spring mechanisms and/or types of springs can be utilized without departing from the scope of the present disclosure. Additional details and further discussion of spring mechanisms are provided with reference to the example spring mechanism 500 (depicted in FIG. 5A) and the example multi-spring mechanism 502 (depicted in FIGS. 5B and 5C), as will be discussed below. It is noted, however, that in some embodiments first spring mechanism 122 can be similar or identical to one or more of the example spring mechanisms 500 and 502. First hinge joint 120 further includes an angular sensor 128, which senses an angular position or amount of rotation at first hinge joint 120. A locking mechanism 124 is also provided at first hinge joint 120, which can be manually engaged (e.g., via rotation of a connected knob) to lock or unlock the rotation of first hinge joint 120 and/or can be electronically engaged (e.g., via a solenoid) to provide automatic lock/unlock functionality and/or a safety and fall prevention functionality. These various functionalities and further details of locking mechanism 124 can be seen in FIG. 4, which will be discussed below.

Second hinge joint 130 couples intermediate link 154 to an upper link 156 of articulating arm 150. As such, intermediate link 154 is coupled at its two ends to first hinge joint 120 and second hinge joint 130. Upper link 156 is a link in the overall linkage of articulating arm 150. In some embodiments, second hinge joint 130 has a default position such that an approximately 90-degree angle is maintained between intermediate link 154 and upper link 156, e.g., as illustrated in FIGS. 2A and 2B. Second hinge joint 130 includes a second spring mechanism 132, shown here as a clock spring, although it is noted that other spring mechanisms and/or types of springs can be utilized without departing from the scope of the present disclosure. In some embodiments, first spring mechanism 122 and second spring mechanism 132 can be identical or similar to one another in their overall construction or mechanical design, noting however that even in the case of such mechanical similarities, the first and second spring mechanisms 122, 132 can be installed or configured to provide different spring forces on articulating arm 150. However, it is contemplated that the discussion provided below with respect to the detailed view of the example spring mechanism 500 depicted in FIG. 5A and/or the example multi-spring mechanism 502 depicted in FIGS. 5B and 5C can, at least in part, apply equally to both the first spring mechanism 122 and the second spring mechanism 132. Second hinge joint 130 further includes an angular sensor 138, which senses an angular position or amount of rotation at second hinge joint 130. The angular sensor 138 can be similar or identical to the angular sensor 128 provided at first hinge joint 120. Although not shown in FIGS. 2A and 2B, in some embodiments the second hinge joint 130 can include a locking mechanism, which can be the same as or similar to one or more of the locking mechanisms 122, 142, and/or 400.

Third hinge joint 140 couples upper link 156 (of articulating arm 150) to the spine assembly 160. As such, upper link 156 is coupled at its two ends to second hinge joint 130 and third hinge joint 140. In some embodiments, third hinge joint 140 has a default position such that an approximately 0-degree angle is maintained between upper link 156 and a mounting coupling disposed on the vertical portion of spine assembly 160, as can be seen in FIGS. 2A and 2B (note that FIGS. 3A and 3B depict side views of a mounting coupling 162 disposed between spine assembly 160 and third hinge joint 140). In other words, third hinge joint 140 can have a default position such that upper link 156 is perpendicular to the vertical portion of spine assembly 160. Third hinge joint 140 includes a third spring mechanism 142, shown here as a torsional spring, although it is noted that other spring mechanisms and/or types of springs can be utilized without departing from the scope of the present disclosure. For example, in some embodiments third spring mechanism 142 can be provided as a clock spring and/or can be provided with a mechanical construction that is similar or identical to that of first spring mechanism 122, second spring mechanism 132, the example spring mechanism 500 depicted in FIG. 5A, and/or the example multi-spring mechanism 502 that is depicted in FIGS. 5B and 5C.

The spring force provided by the third spring mechanism 142 can be different than the spring force(s) provided by the first and/or second spring mechanisms 122 and 132, respectively. For example, to maintain default positions such as the ones discussed above and depicted in FIGS. 1, 2A and 2B, the third spring mechanism 142 provides a spring force sufficient to balance the weight of spine assembly 160; the second spring mechanism 132 provides a spring force sufficient to balance the combined weight of spine assembly 160 and at least a portion of the upper link 156; the first spring mechanism 122 provides a spring force sufficient to balance the combined weight of spine assembly 160, and at least a portion of upper link 156 or intermediate link 154, etc. However, it is contemplated that the discussion provided below with respect to the detailed view of the example spring mechanism 500*a* depicted in FIG. 5A (and/or the discussion provided with respect to the example multi-spring mechanism 502 of FIGS. 5B and 5C) can, at least in part, apply equally to the first, second and third spring mechanisms 122, 132, and 142, respectively. Third hinge joint 140 further includes an angular sensor 148, which senses an angular position or amount of rotation at third hinge joint 140. A locking mechanism 144 is also provided at third hinge joint 140, which can be manually engaged (e.g., via rotation of a connected knob) to lock or unlock the rotation of third hinge joint 140 and/or can be electronically engaged (e.g., via a solenoid) to provide automatic lock/unlock functionality and/or a safety and fall prevention functionality. In some embodiments, locking mechanism 144 can be similar or identical to locking mechanism 124 provided at first hinge joint 120 and/or the example locking mechanism 400 depicted in FIG. 4.

A damper mechanism 170 can further be provided in conjunction with a cam 172 that rotates with the second hinge joint 130. In some embodiments, cam 172 can be rigidly affixed to an outer portion of second hinge joint 120 such that the cam and hinge joint rotate together. As illustrated, damper mechanism 170 includes an extensible rod 174 having a distal end shaped to contact and interact with cam 172—depending on the relative position of cam 172 and the distal end of extensible rod 174, the extensible rod 174 extends or retracts along the longitudinal length of damper mechanism 170. Damper mechanism 170 can be configured to resist (i.e., damp) compressive forces which act in a direction that causes extensible rod 174 to be retracted deeper into the body of damper 170. For example, in the illustration of FIG. 3A, damper mechanism 170 can be configured to resist or damp compressive forces acting to the left, e.g., by providing a damping force that acts to the right.

The curvature of cam 172 can be adjusted to vary these compressive forces, and hence the corresponding damping force response provided by damper mechanism 170. In particular, the interaction between cam 172 and the distal end of extensible rod 174 can define a damping profile over the rotational range of second hinge joint 130 (recalling that cam 172 is rigidly affixed to the second hinge joint 130, such that the two rotate together). For example, the damping profile can relate various angular positions of second hinge joint 130 to corresponding expected magnitudes of the damping force at each angular position.

As illustrated, damping mechanism 170 and second spring mechanism 132 are located on opposite faces of the second hinge joint 130. As mentioned previously, the damping profile corresponding to the interaction between damper mechanism 170 and cam 172 can be chosen or otherwise configured to provide a damping force to oppose (i.e., damp) the spring force exerted by second spring mechanism 132.

The second spring mechanism 132 is depicted as a clock spring that is wound in a counterclockwise direction, e.g., as can be seen in FIG. 3B. Based on this counterclockwise orientation, second spring mechanism 132 is compressed when the upper link 156 of articulating arm 150 rises above parallel with the ground plane (e.g., in the view of FIG. 3B, when upper link 156 is rotated counterclockwise) and is extended when the upper link 156 falls below parallel with the ground plane (e.g., in the view of FIG. 3B, when upper link 156 is rotated clockwise).

By contrast, the rod 174 of damping mechanism 170 extends when upper link 156 of the articulating arm rises above parallel with the ground plane and compresses when upper link 156 falls below parallel with the ground plane. Because the damping mechanism resists compression, damping mechanism 170 can be seen to provide a damping force that mediates or otherwise works in parallel with the spring force exerted by the coiled clock spring 132. In some embodiments, damping mechanism 170 (and/or a cam associated with the damping mechanism) can be configured to provide a damping force that works in opposition with the spring force exerted by spring 132, e.g., thereby smoothing the net force experienced at or about the hinge joint 130 by a user of the omnidirectional locomotion system. By balancing the damping force and the spring force, both of which act at second hinge joint 130, the upper link 156 of the articulating arm can be held in its previously described default position that is approximately horizontal or parallel to the ground plane. Accordingly, a user of the omnidirectional locomotion system 100 may experience a resistance force from second hinge joint 130 that is a combination of the spring force exerted by spring mechanism 132 and the opposing damping force exerted by damping mechanism 170.

Similarly, first hinge joint 120 can provide a resistance force via the spring force exerted by its spring mechanism 122, and third hinge joint 140 can provide a resistance force via the spring force exerted by its spring mechanism 142. In some embodiments, one or more of the resistance forces provided at the hinge joints 120, 130, 140 can be variable and/or user adjustable. For example, a novice user may prefer a stronger resistance force that more aggressively biases one or more links of the articulating arm 150 back to a default position (such as the default position seen in FIG. 1), whereas a more experienced user may prefer a weaker resistance force that permits freer movement across a wider range of motion. Similarly, a heavier user may prefer or require a stronger resistance force than a comparatively lighter user.

For example, a resistance force at the second hinge joint 130 can be adjusted via a user-actuatable knob or gearing system provided on damper mechanism 170. By increasing the damping force applied by damper 170, the perceived resistance force at second hinge joint 130 can be increased as well; likewise, by decreasing the damping force applied by damper 170, the perceived resistance force at second hinge joint 130 can be decreased. In some embodiments, e.g., where the damper 170 is configured to work in opposition to the spring 132, the inverse can be true—increasing the damping force applied by damper 170 would decrease the perceived resistance force at the second hinge joint 130; and decreasing the damping force applied by damper 170 would increase the perceived resistance force at the second hinge joint 130.

Although damping mechanism 170 is illustrated as an externally mounted component, in some embodiments it is contemplated that damping mechanism 170 can be internally or integrally provided within the upper link 156 of articulating arm 150. In such a configuration, cam 172 may additionally be located within an interior volume of the upper link 156, positioned such that the interaction between the cam and the extensible rod 174 of the damping mechanism is substantially the same as described above. In some embodiments, an internally provided damping mechanism 170 can be configured with an external adjustment mechanism that allows users to increase or decrease the damping force. For example, an adjustment knob or wheel can protrude through an aperture in the upper link 156 of the articulating arm, such that the adjustment knob is user-accessible on the exterior of upper link 156 while also being coupled to damping mechanism 170 on the interior.

Turning next to the spine assembly 160 of the presently disclosed omnidirectional locomotion system, as depicted in FIGS. 1-3B the spine assembly 160 is attached to an upper link 156 of the articulating arm 150 via third hinge joint 140, which allows the spine to pivot up or down. This movement allows a user to move more freely while using the omnidirectional locomotion system (e.g., coupled to spine assembly 160 via a vest or harness), as in the absence of third hinge joint 140, the user would be locked into a single spinal posture while using the omnidirectional locomotion system, e.g., would be required to stand fully erect at all times. The hinge joint 140 between the spine assembly 160 and the upper link 156 of articulating arm 150 allows a variety of bending movements to be performed by the user, such as bending forward to lean towards the ground, or leaning back in order to look up.

As illustrated, the spine assembly 160 has a curved shape that can provide a more ergonomic and comfortable user experience. In some embodiments, the curvature of spine assembly 160 can approximate or match the standard curvature of the human spine, e.g., the curvature present between the upper spine near the neck and the top of the lumbar spine. By providing this curvature in spine assembly 160 (or in the rail(s) of the spine component), users of the presently disclosed omnidirectional locomotion system can perform more natural bending motions from the waist or hips and can more generally feel less restricted or encumbered from being attached to the articulating arm 150/spine assembly 160. In some embodiments, spine assembly 160 can take a variety of other shapes and/or curvatures without departing from the scope of the present disclosure. For example, spine assembly 160 can have a more or less pronounced curve, an asymmetrical curve, a 'S' shaped curve, can be straight along some or all of its length, etc. Additionally, it is further contemplated that the spine assembly 160 can be adjustable or bendable to match the unique curvature of a given user's spine. For example, spine assembly 160 can be articulated or otherwise comprise a plurality of joints, hinges, or other adjustable portions that allow the overall shape and/or curvature of the spine assembly to be adjusted to better suit a user's particular needs or body type/shape.

In some embodiments, the spine assembly 160 can be configured to rotate in at least two degrees of freedom. A first degree of freedom can be associated with the rotation of third hinge joint 140 (e.g., permitting spine assembly 160 to rotate either clockwise or counterclockwise, in the side perspective seen in FIGS. 3A and 3B). A second degree of freedom can be provided perpendicular to the first degree of freedom. For example, as seen in the front perspective of FIGS. 3C-E, spine assembly 160 can be permitted to rotate away from its upright, vertical position (with the upright vertical position seen in FIG. 3D). In other words, the first degree of freedom can permit spine assembly 160 to tilt forward and backward, while the second degree of freedom can permit spine assembly to roll left and right.

Figure 3E:
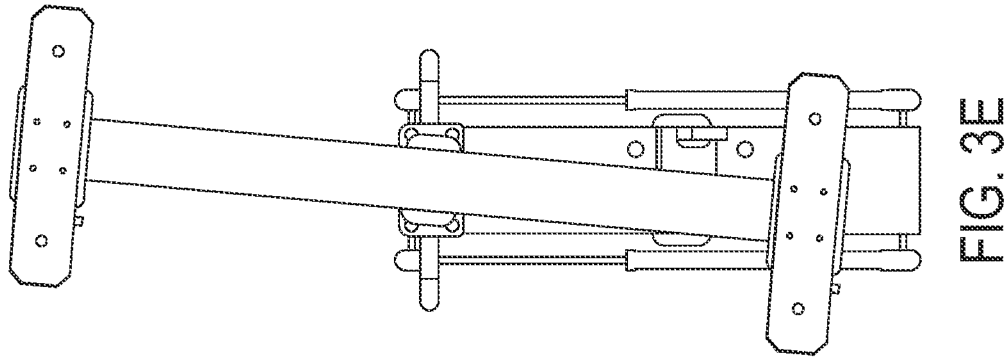
FIGS. 3C-E depict a front view of an upper articulating arm assembly of an example omnidirectional locomotion system in various rotational positions, according to one or more aspects of the present disclosure.
Figure 3D:
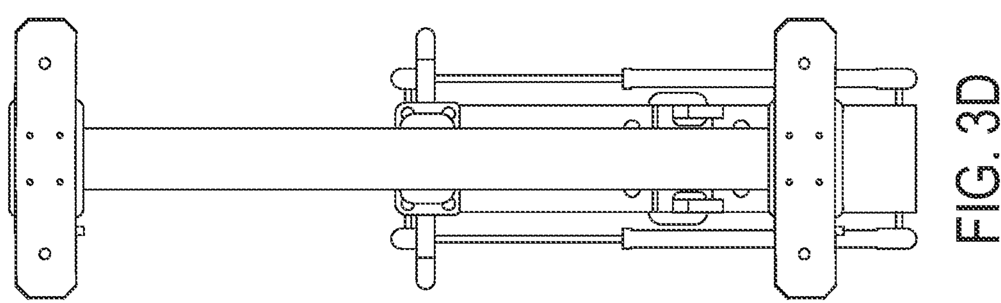
Figure 3C:
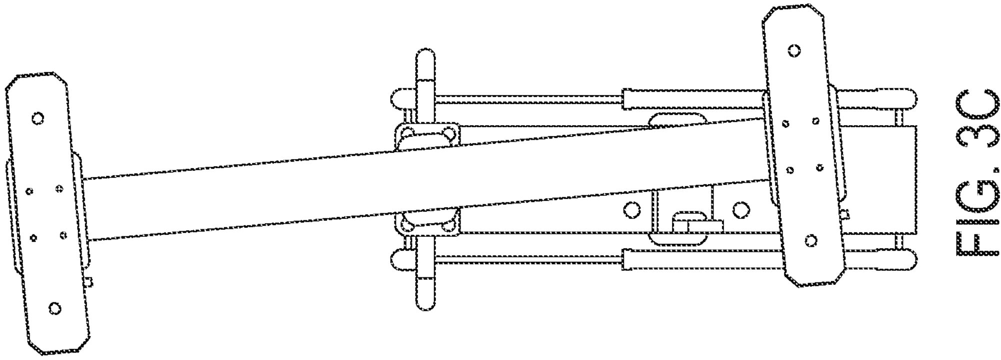

As mentioned previously, the first degree of freedom (tilting up and down) can be provided by the rotation of third hinge joint 140. In some embodiments, the second degree of freedom (rolling left and right) can also be provided by third hinge joint 140, in which case third hinge joint 140 can be provided as a two-DOF or two-axis rotational joint. For example, as can be seen in FIGS. 3C-E, the center of rotation is located in line with the third hinge joint 140. In some embodiments, the second degree of freedom can be provided by a rotational mechanism that is separate from third hinge joint 140. For example, one or more ball bearing couplers or other rotational couplers can be used to separately provide the rotation(s) of spine assembly 160 that are depicted in FIGS. 3C-E. The ball bearing/rotational coupler can be provided between the articulating arm 150 and the third hinge joint 140, can be provided between the third hinge joint 140 and the spine assembly 160, or both.

As illustrated in FIGS. 3C-E, in some embodiments the second degree of freedom provided to spine assembly 160 can be configured with a limited range, such as ±5 degrees, although it is appreciated that other rotational ranges can be utilized without departing from the scope of the present disclosure. In other words, the second degree of freedom can be provided such that a user wearing the vest of omnidirectional locomotion system 100 can tilt his or her shoulders to the left or right over an approximately natural range of motion, without having a rotational range so large as to permit, for example, the user's shoulders to reach an orientation in which they are perpendicular to the ground.

Upper and lower portions of the spine assembly 160 can include vest couplers that each provide an attachment point for a user's vest (or harness, etc.) to be connected to the spine assembly 160, and therefore connected to the articulating arm 150 of the omnidirectional locomotion system. The vest can be rigidly attached to spine assembly 160 via the vest couplers, or the vest couplers can provide some degree of movement, to better accommodate for different sized vests and/or users. For example, the vest couplers can be made of a flexible or semi-flexible rubber, thermoplastic, or other elastic material. In some embodiments, one or more of the attachments between the vest mounting couplers and spine assembly 160 can be provided as a hinge, e.g., permitting the vest mounting couplers to rotate up and/or down relative to spine assembly 160, rather than being fixed in a particular position (e.g., such as the perpendicular position seen in FIGS. 3A and 3B). In scenarios in which a hinged attachment is utilized with one or more of the vest mounting couplers, the hinge can be integrated with the vest mounting coupler or can be provided separately. Independent of the manner in which the hinge is provided, the presence of the hinge between the vest mounting coupler and the spine assembly 160 can permit the vest to better conform to a user's body, e.g., by better approximating the curvature of the spine. In some embodiments, the hinged attachment can comprise a free-floating or freely adjustable hinge, i.e., such that the vest mounting couplers are automatically rotated into an appropriate position for the user wearing the vest, rather than requiring the user to manually set the hinge rotation/position of the vest mounting couplers prior to putting on the vest.

Regardless of the rigidity of the connection, the vest couplers can cause the vest (and a user wearing the vest) to be attached vertically between the upper and lower ends of spine assembly 160. The vest can be removably attachable (and detachable) to the vest couplers of spine assembly 160, e.g., to permit washing of the vest and/or installation of vests with different physical size/dimension to better match each user of the omnidirectional locomotion system 100.

The vet can be adjustable prior to use of the omnidirectional locomotion system 100) and/or the vest can be adjustable during the use of the omnidirectional locomotion system 100. For example, adjustment can be made prior to use in order to provide increased user comfort, e.g., by better conforming to the user's body type, shape, height, etc. Such user setup adjustments to the vest can, in some embodiments, be made by moving or otherwise repositioning the vest vertically with respect to spine assembly 160. In other words, while spine assembly 160 remains fixed, the position of the vest can be adjusted in the vertical direction, e.g., via a sliding mechanism and/or by repositioning one or more of the vest mounting couplers at different locations along the spine assembly 160. In some embodiments, the relative positioning of the vest and spine assembly 160 can remain fixed, and adjustment can instead be made to the location at which spine assembly 160 is attached to the third hinge joint 140, thereby causing the vest and spine assembly 160 to move as a single unit.

As mentioned above, in some embodiments, the vest for attaching a user's body or torso to spine assembly 160 can be provided in multiple different sizes to accommodate the different physical dimensions of users. In some embodiments, the vest can be integrated with or otherwise more permanently attached to spine assembly 160, rather than removable via the vest couplers, e.g., in such a scenario, the entire vest and spine assembly combination can be attached and detached at third hinge joint 140 as needed.

The vest can be unpowered and used primarily to secure the user to the articulating arm 150 of the omnidirectional locomotion system. However, it is also contemplated that the vest can receive power, whether from a battery, an external power source, and/or from a power supply routing from a slip ring within the base 610, through articulating arm 150, and to the vest. Such a power arrangement could be provided via a standard plug or outlet on spine assembly 160, such that the vest could be plugged in by the user, or power connectors could be integrated in the vest couplers of spine assembly 160 in order to provide power to the vest in a more seamless manner. The vest can additionally include one or more pouches, storage compartments, and/or receptacles, etc., designed to store one or more VR hand controllers when not in use by the user of omnidirectional locomotion system 100. In some examples, the vest can hold or store a VR headset in addition to one or more VR hand controllers.

In some embodiments, the vest can include one or more biometric sensors to detect the physical state of the user. These biometrics can include, but are not limited to, heart rate, respiration rate, perspiration rate, blood pressure, body temperature, etc. In some embodiments, the omnidirectional locomotion system can pass the sensed biometric measurements to a coupled VR headset and/or a coupled VR computing device such that the user's biometric measurements can be used as inputs to dynamically customize his or her VR environment. In some embodiments, the vest, when connected to a power source, can be used to provide haptic or other physical feedback to a user of the omnidirectional locomotion system, where the haptic or physical feedback corresponds to occurrences within the VR environment of the user. For example, the vest could include a temperature control system to provide the user with different temperature sensations corresponding to their VR environment, could include one or more actuators or motors to provide impact forces/pressure sensations when a user experiences physical impacts/trauma/damage in the VR environment, etc. In some embodiments, the physical feedback can be based on one or more locomotion inputs received from the user or otherwise sensed by the omnidirectional locomotion system, e.g., the user could experience a shaking or impact sensation after performing a jumping motion on the omnidirectional locomotion system.

In some embodiments, third hinge joint 140 is allowed to move through a defined range of motion, either unrestricted or subject to some resistance force applied by the third spring mechanism 142 (it is also noted that the hinge joint's defined range of motion can be predetermined by the physical design of the third hinge joint 140 and/or may be user adjustable). However, in some embodiments third hinge joint 140 can include a locking mechanism 144, which will later be discussed in greater depth. In general terms, locking mechanism 144 can be engaged to prevent any motion of the third hinge joint 140. For example, this can be desirable when a user is uncomfortable or unfamiliar with the hinging motion that articulating arm 150 and spine assembly 160 can otherwise provide, e.g., when a novice user is still becoming familiarized with use of the omnidirectional locomotion system.

The locking mechanism 144 can be actuated such that third hinge joint 140 is locked into a pre-determined 'locked' position, which might correspond to a generally upright orientation of spine assembly 160 with respect to the ground plane or base portion 110 of the omnidirectional locomotion system. It is also possible that locking mechanism 144 can provide a user with a choice between multiple different locked positions of third hinge joint 140 and/or spine assembly 160, which can include but are not limited to, fully upright, partially upright, and fully down. In some embodiments, locking mechanism 144 can be freely engaged by the user to lock third hinge joint 144 and spine assembly 160 in any desired position within the range of motion associated with third hinge joint 140, thereby offering greater flexibility and customization options for various user needs and usage scenarios.

More generally, in addition to the spring and damping mechanisms for providing resistance forces at the hinge joints 120, 130, 140 as described previously, one or more locking mechanisms can also be provided in order to lock or otherwise prevent the rotation of a hinge joint. For example, FIGS. 2A and 3A depict a locking mechanism 124 for locking the rotation of first hinge joint 120 and a locking mechanism 144 for locking the rotation of third hinge joint 140. Although not shown, a locking mechanism can additionally be provided on or integrated with second hinge joint 130 without departing from the scope of the present disclosure.

In addition to the locking mechanism(s), one or more hinge rotation limiters can be provided at one or more of the hinge joints. For example, FIGS. 3A and 3B depict a hinge rotation limiter 126 provided at first hinge joint 120. In operation, interference between the arm link 154 and the upward-protruding, angled tab of the rotation limiter 126 prevents the arm link 154 from rotating beyond a certain angular displacement or degree of rotation. In some embodiments, the rotation limiter 126 can be provided as an interchangeable component, with different examples of rotation limiter 126 each permitting a greater or lesser amount of rotation by the hinge joint. For example, novice users of omnidirectional locomotion system 100 may prefer a smaller range of motion at the hinge joints, and hence, a greater degree of restriction by the rotation limiter 126. In some embodiments, rotation limiter 126 can be removably attachable (and detachable) to hinge joint(s) of articulating arm 150.

One or more of locking mechanisms 124 and 144 can be manually engaged to lock the rotation of its corresponding hinge joint (e.g., via a user rotation of a knob coupled to drive the locking mechanism) and/or can be electronically engaged (e.g., via a solenoid). In some examples, electronic actuation of a solenoid or other drive component of the locking mechanism(s) can be used to provide automatic lock and unlock functionality for the hinge joints of articulating arm. For example, a circuit could be completed when a user buckles on a vest or harness attached to spine assembly 160 such that the completion of the circuit triggers the solenoid to actuate the locking mechanism out of a default locked position and into an unlocked position. Breaking the circuit, either intentionally (e.g., the user removes the vest when done using the omnidirectional locomotion system 100) or accidentally (e.g., the user slips and falls) can automatically cause the solenoid to actuate the locking mechanism that prevents any further rotation of articulating arm 150. In some embodiments, one or more locking mechanisms can be configured at the hinge joints 120, 130, and/or 140 in order to provide safety or fall prevention functionalities. These various functionalities are discussed along with further details of an example locking mechanism 400 as can be seen in FIG. 4.

Figure 4:
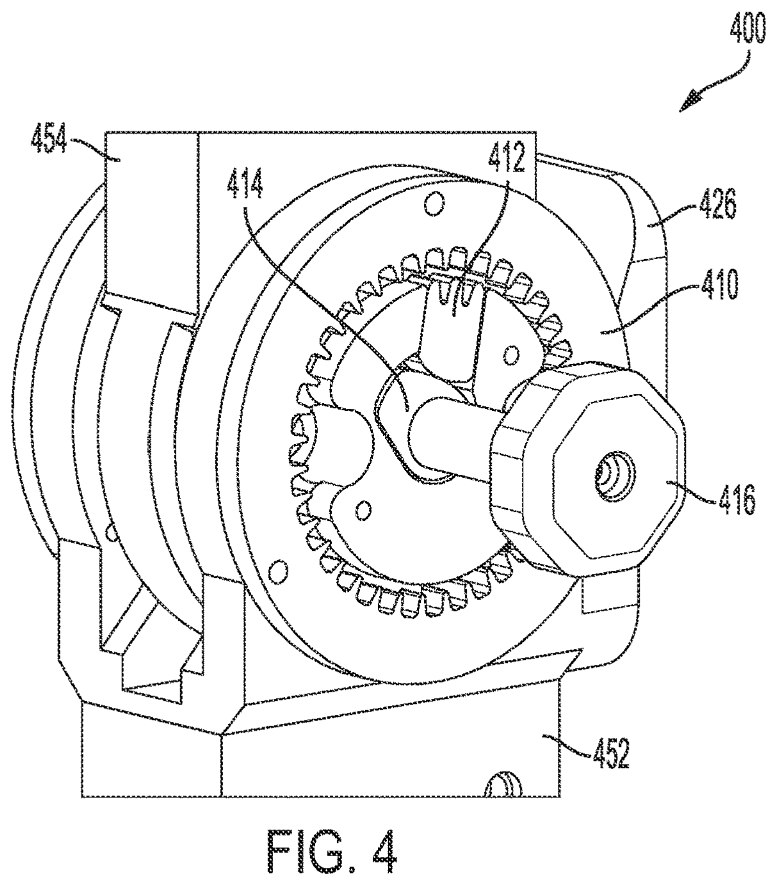
FIG. 4 is a perspective view of an example locking mechanism according to one or more aspects of the present disclosure.

The example locking mechanism 400 of FIG. 4 can be similar or identical to one or more of the locking mechanisms 124 and 144 that are provided at the first and third hinge joints 120 and 140, respectively. In some embodiments an additional locking mechanism that is similar or identical to example locking mechanism 400 can also be provided at or integrated with second hinge joint 130. As illustrated, example locking mechanism 400 comprises a planetary gear 410, a locking gear 412 having teeth adapted to mesh with those of planetary gear 410, and a cam 414 coupled to a knob 416. Rotation of knob 416 (here, in the counterclockwise direction) causes a corresponding rotation of cam 414, which contacts locking gear 412 and drives it radially outward and into a locking engagement with the teeth of planetary gear 410. The locking engagement between the meshed teeth of locking gear 412 and planetary gear 410 operates to lock the hinge joint and prevent any further rotation until locking gear 412 is brought out of engagement with planetary gear 410.

Planetary gear 410 and locking gear 412 can be rigidly coupled to the two different links that interface at the hinge joint upon which locking mechanism 400 is installed. For example, as illustrated planetary gear 410 is affixed to (and rotates with) a lower link 452 of the hinge joint while locking gear 412 is affixed to (and rotates with) an upper link 454 of the same hinge joint. Therefore, when locking gear 412 is meshed with planetary gear 412 such that the two gears cannot rotate relative to one another, so too are lower link 452 and upper link 454 of the hinge joint likewise prevented from rotating relative to one another, thus locking the hinge joint.

In some embodiments, the example locking mechanism 400 can be provided on the interior of the hinge joint, rather than externally mounted as shown in FIG. 4. For example, the locking mechanism 400 could be mounted on the inner face of lower link 452 rather than the outer face or could be mounted within an interior volume of either lower link 452 or upper link 454. A servo or other electronic actuation mechanism (not shown) can also be provided with the example locking mechanism 400 in order to automatically bring the locking gear 412 into and out of a locked engagement with planetary gear 410.

Figure 5A:
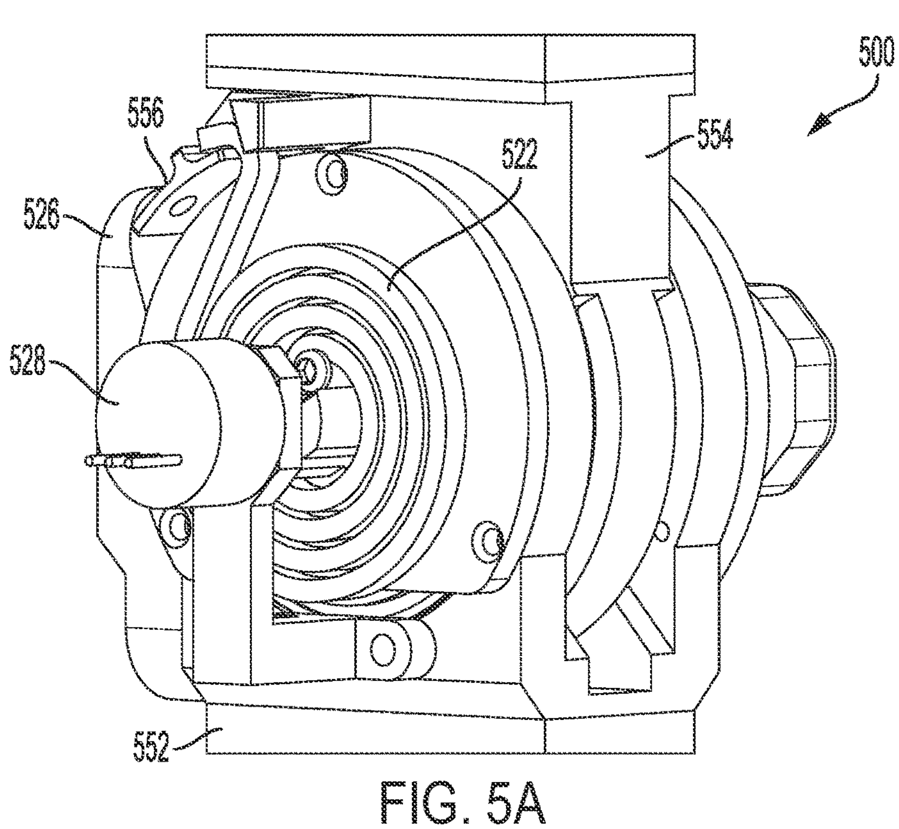
FIG. 5A is a perspective view of an example spring mechanism according to one or more aspects of the present disclosure.
Figures 5B, 5C:
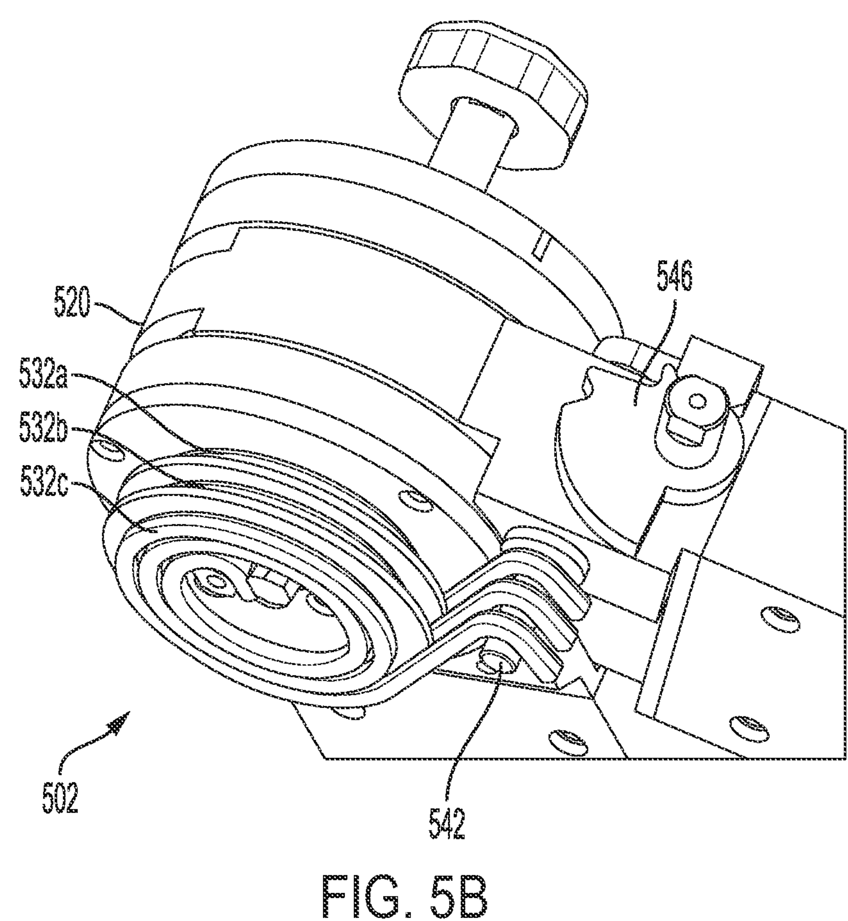
FIG. 5B is a perspective view of an example multi-spring mechanism according to one or more aspects of the present disclosure.
FIG. 5C is a side view of an example multi-spring mechanism according to one or more aspects of the present disclosure.

FIG. 5A illustrates an example spring mechanism 500 that can be configured to provide a resistance force at one or more of the hinge joints of articulating arm 150. As opposed to FIGS. 5B and 5C, which depict an example multi-spring mechanism 502, the example spring mechanism 500*a* consists of a single spring 522. As illustrated, the example spring mechanism includes a clock spring 522, although it is appreciated that various other types of springs (including but not limited to torsional springs, linear springs, and adjustable compression springs) can also be utilized without departing from the scope of the present disclosure. The spring 522 can be rigidly coupled to an outer face of a lower link 552 that terminates in the hinge joint, such that spring 552 and lower link 552 do not experience relative rotation with respect to one another. A spring engagement tab 556 can be affixed to rotate with an upper link 554 that also terminates into the same hinge joint as lower link 552, such that spring engagement tab 556 compresses or winds spring 552 when upper link 554 is rotated clockwise (in the perspective of FIG. 5A). From this compressed/wound position, spring 552 can subsequently provide a restoring spring force that is transmitted through spring engagement tab 556 and biases upper link 554 of the articulating arm to rotate in the opposite, counterclockwise direction (again, in the perspective of FIG. 5). The above example corresponds to a scenario in which spring 552 is wound in a clockwise fashion; by reversing the orientation of spring 552 such that it is wound in a counterclockwise fashion, the directionality of the restoring spring force can also be reversed. For example, with reference to FIGS. 2B and 3B, it is noted that the first spring mechanism 122 and the second spring mechanism 132 have opposite orientations and apply opposite spring restoring forces to the first hinge joint 120 and second hinge joint 130, respectively.

As mentioned previously, FIGS. 5B and 5C illustrate an example multi-spring mechanism 502, which can be configured to provide an adjustable resistance force at one or more of the hinge joints of articulating arm 150. FIG. 5B is a perspective view of the example multi-spring mechanism 502, provided at a hinge joint 520 (which can be the same as or similar to one or more of the hinge joints 120, 130, and 140 described above). FIG. 5C is a side view of the same example multi-spring mechanism 502 that is shown in FIG. 5C.

The example multi-spring mechanism 502 is shown as including three springs 532*a*, 532*b*, and 532*c*, although a greater or lesser number of springs may also be utilized without departing from the scope of the present disclosure (e.g., two springs, four springs, etc.). In some embodiments, one or more of the springs 532*a-c* can be the same as or identical to the single spring 522 discussed above with respect to FIG. 5A. As illustrated, the three springs 532*a-c* are shown as being identical to one another, although it is also possible for one or more of the three springs 532*a-c* to be different, either in design, spring force/response, or both. Additionally, the three springs 532*a-c* are illustrated as being clock springs, although it is appreciated that various other types of springs (including but not limited to torsional springs, linear springs, and adjustable compression springs) can also be utilized without departing from the scope of the present disclosure.

The multi-spring mechanism 502 is provided with a rotatable cam 546, which is coupled to a pin 542 that can be linearly retracted and extended from the body of the hinge joint 520 in response to rotation of the cam 546. Cam 546 can be rotated automatically (e.g., driven by a servo, electric motor, etc.), manually (e.g., by a user), or both. The rotation of cam 546, and hence the corresponding location of pin 542, can be selected in order to engage or disengage the desired number of springs 532*a-c*, thereby adjusting the amount of resistance force provided by the multi-spring mechanism 502 at hinge joint 520. For example, based on the amount by which pin 542 is extended from the body of hinge joint 520, none of the springs 532*a-c* can be engaged (e.g., pin 542 is fully retracted); only spring 532*a* can be engaged; springs 532*a* and 532*b* can be engaged; or all three springs 532*a-c* can be engaged. As more springs are engaged by pin 542, a greater resistance force is provided at hinge joint 520; conversely, as fewer springs are engaged by pin 542, a lesser resistance force is provided at hinge joint 520.

Base Portion

Figures 6A, 6B:
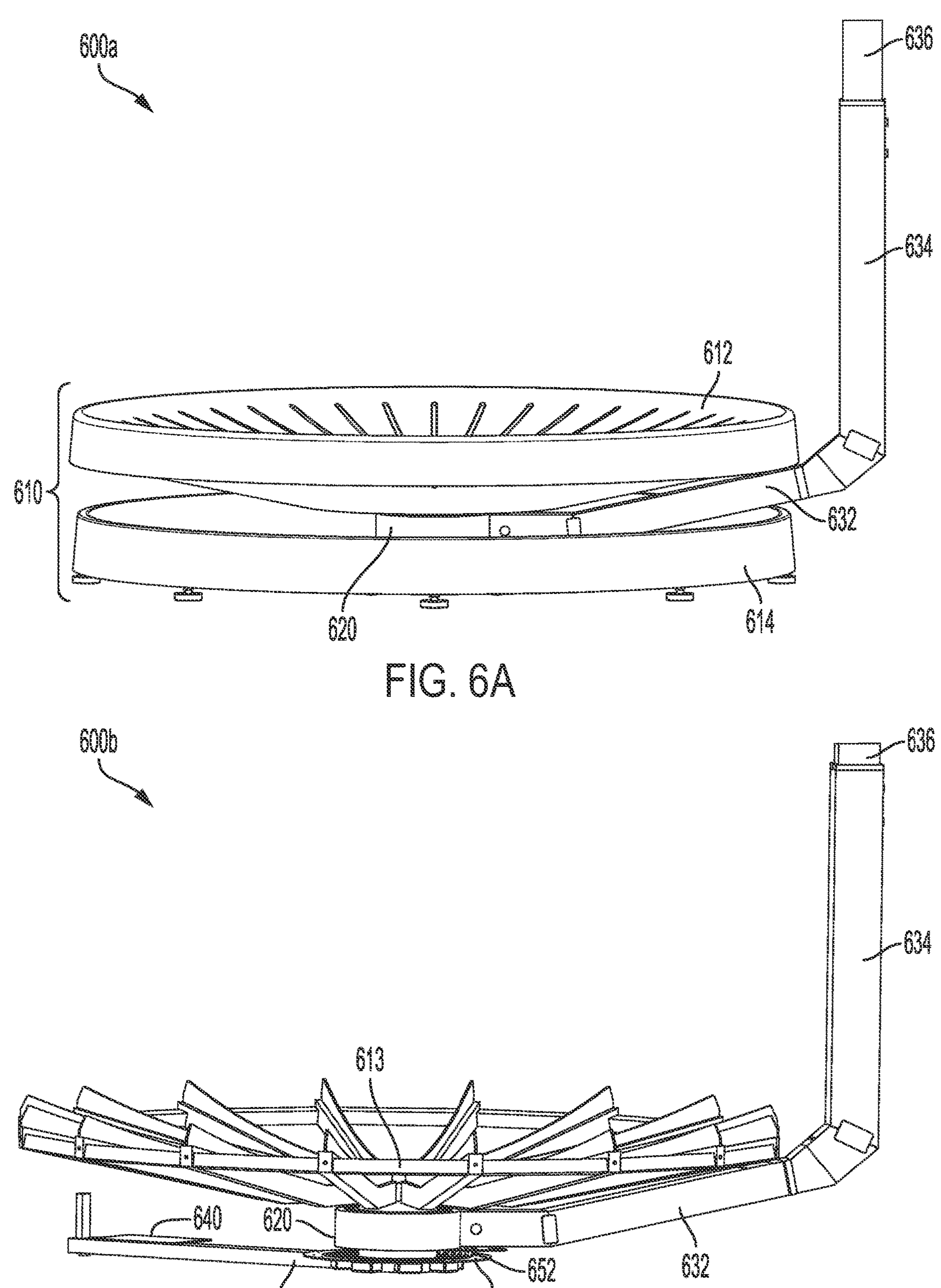
FIG. 6A depicts an example base portion of an omnidirectional locomotion system according to one or more aspects of the present disclosure.
FIG. 6B depicts an internal view of an example base portion of an omnidirectional locomotion system according to one or more aspects of the present disclosure.

Various depictions and components of an example base portion of an omnidirectional locomotion system are presented in FIGS. 6A-7B. In general, a base portion 610 (which in some embodiments is similar or identical to the previously described base portion 110) comprises a fixed platform 612 upon which a user stands and a fixed base frame 614 that rests on the ground and provides support and stability to the omnidirectional locomotion system as a whole. As shown in FIGS. 6A and 6B, the platform 612 corresponds to the upper half of base portion 610, while the frame 614 corresponds to the lower half of base portion 610. The platform 612 includes a concave outer shell upon which the user can stand, walk, run, crouch, jump, etc. while coupled to an articulating arm belonging to the same omnidirectional locomotion system as base portion 610. Note that several lower links 632, 634 and 656 of an articulating arm (such as articulating arm 150) can also be seen in FIGS. 6A and 6B. As shown, the concave outer shell of platform 612 has an generally circular shape, although it is appreciated that various other shapes and visual designs can also be employed without departing from the scope of the present disclosure. For example, in some embodiments, the outer shell of platform 612 can be provided with an octagonal or multi-faceted shape. Similarly, in some embodiments, the outer shell can be provided with a more concave or less concave shape than what is shown in the example figures. The outer shell can be provided with a flat shape, or even a convex shape if so desired, without departing from the scope of the present disclosure.

The platform 612 and base frame 614 are depicted as being of an approximately constant and equal diameter, although it is appreciated that a varying diameter can be utilized for one or both of these two components of base portion 610. More particularly, it is possible but not necessary that the platform 612 and the base frame 614 have the same or substantially the same outer diameter. As illustrated, platform 612 and base frame 614 are vertically separated from one another, leaving a gap in which a lower portion 632 of the articulating arm can be received and coupled to a central rotating mechanism 620 (e.g., such as a hub or bearing). In some embodiments, platform 612 and base frame 614 can be rigidly connected to one another via an interior, fixed element of the central rotating hub 620, an example of which is illustrated in the cutaway view of FIG. 6B. For example, the lower portion 632 of the articulating arm can terminate in a collar that is installed around (and rotates about) the outer circumference of a rigid post that couples the upper platform of the base to the frame of the base.

In some embodiments, one or more foot guards can be provided on or about the base portion 610. For example, a foot guard could be provided in a circular shape having a diameter approximately equal to that of the base platform 612, such that the foot guard rises vertically above the upper edge of the base platform 612 in order to provide a barrier that prevents a user's foot from slipping or sliding off of base platform 612. The foot guard could be tubular in nature and mounted such that the foot guard rotates with the articulating arm, e.g., rotates relative to the fixed base 610 and the fixed base platform 612. In particular, the foot guard can consist of a circular rim element that is vertically displaced some height above the base platform 612, such that the circular rim element of the foot guard is in a plane substantially parallel to the upper surface/edges of the base platform 612. In some examples, the height of the foot guard above the edge of base platform 612 can be such that, in the event of a user's foot sliding or slipping off of the base platform, the user's upper foot, ankle, or lower shin would make contact with the foot guard, thereby arresting or preventing the slip from progressing further.

In some embodiments, the circular rim of the foot guard can be attached to the articulating arm at various locations, e.g., at segment 632 (below the base platform 612) and/or at segment 634 (e.g., above the base platform 612). In such a scenario, it is contemplated that the foot guard rotates with the articulating arm, as mentioned above. However, it is also possible for the foot guard to be attached such that it remains fixed relative to the base platform 612, e.g., as the articulating arm rotates around the base platform 612, the foot guard remains stationary. In such a scenario, the foot guard could be rigidly affixed to the bottom face of the base platform 612 and/or could be rigidly affixed to the upper face of the base frame 614.

The foot guard may be generally circular in nature and may be provided as a one-piece construction or a multi-piece construction. A one-piece construction can correspond to a foot guard that is a complete (e.g., closed) circle, such that no gaps are present. A one-piece construction may also correspond to a foot guard that is not a closed circle, but has only a single, small gap (e.g., an approximately 'U' or 'C' shape). In some embodiments, a gap in the foot guard can be located directly in front of the articulating arm (e.g., in a scenario in which the foot guard rotates with the articulating arm rather than remaining fixed relative to the base portion 610). A multi-piece construction can also be provided, corresponding to a foot guard that comprises multiple segments with gaps between adjacent segments. For example, a two-piece foot guard might consist of two foot guard segments arranged to generally follow the outer circumference of the base platform 612. When the foot guard is provided as a multi-piece construction, the constituent segments of the foot guard can be identical or different, and moreover, can be symmetrically or asymmetrically arranged about the base platform 612.

In FIG. 6B, the outer shell of platform 612 is no longer shown (i.e., the shell upon which the user stands). Depicted instead is a sub-frame 613 upon which platform 612 can be installed. Sub-frame 613 can comprise one or more support rails arranged radially to provide structural strength and to support the platform 612 and any users thereof. In some embodiments, a noise dampening foam or other sound-absorption material can be installed in the gaps between the radial support rails of sub-frame 613, e.g., to deaden the noise and/or soften the impact of a user's footsteps on the platform 612.

In some embodiments, although not shown, base portion 610 and in particular, base frame 614, can include a pair of wheels and/or a handle to allow for easy transport and storage when the omnidirectional locomotion system of the present disclosure is folded or otherwise manipulated into a compact, storage configuration. For example, in some embodiments the upper arm assembly (comprising one or more of the articulating arm and the spine assembly of the omnidirectional locomotion system) can be folded down to be substantially flush with or otherwise closer to the base. In some embodiments, a lockable hinge (not shown) can be provided on the articulating arm, e.g., between segments 632 and 634 of the articulating arm. In this manner, an optional hinge can permit the articulating arm to be folded down towards the base portion 610 and then locked in the folded, storage position. The hinge can additionally permit the articulating arm to be opened out of the folded, storage position and locked in an upright, vertical position when a user desires to use the omnidirectional locomotion system Once folded into a more compact storage position, the optional hinge can be configured to lock the upper arm assembly in place, as mentioned above. In some embodiments, a user can then grab a handle provided on one or more of the base portion 610 and the articulating arm (e.g., along segment 634 of the articulating arm) and use the wheels to roll the folded omnidirectional locomotion system to a desired location for storage.

The rotation mechanism 620 can comprise a rotatable hub or bearing that couples platform 612 to base frame 614, e.g., along a stationary central or inner axis of the rotation mechanism 620. One or more rotation sensors can be provided in combination with rotation mechanism 620, in the platform 612, in base frame 614, or some combination of the above. The rotation sensors can measure the relative rotation or angular position of the articulating arm with respect to the fixed base frame 614, and more specifically, can measure the relative rotation or angular position of a user with respect to the fixed base frame 614—recalling that a user is coupled to the rotatable articulating arm via the vest and spine assembly of the arm.

Figure 7A:
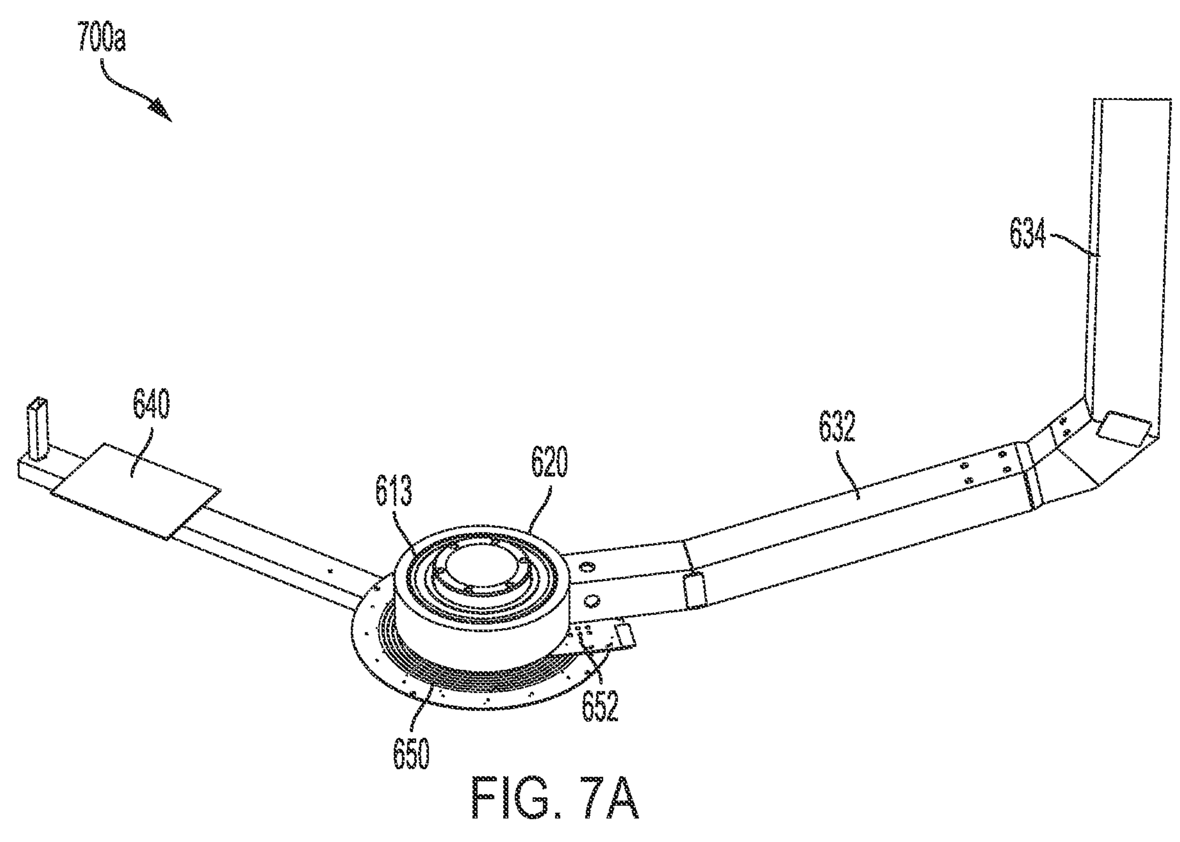
FIG. 7A depicts an example of a rotation mechanism coupled between an articulating arm and base potion of an omnidirectional locomotion system according to one or more aspects of the present disclosure.
Figure 7B:
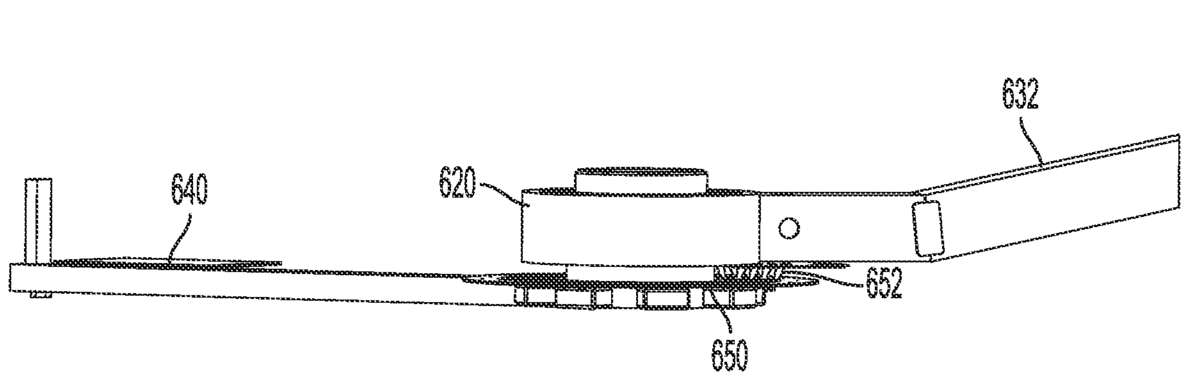
FIG. 7B depicts a side view of the example rotation mechanism of FIG. 7B.

In some embodiments, one or more Hall-effect sensors can be used to detect and measure the rotation/angular position of the rotatable articulating arm, although it is appreciated that one or more other sensors (e.g., besides or in addition to Hall-effect sensors) can be utilized to detect and measure the rotation/angular position of the rotatable articulating arm). For example, as illustrated in FIGS. 6B-7B, a plurality of Hall-effect sensors can be provided in a circular pattern along a slip ring 650 that is provided as a component of base frame 614 (noting that for purposes of clarity, FIG. 6B depicts base frame 614 only in part and FIGS. 7A-B depict only the articulating arm and slip ring 650). The slip ring 650 can additionally route power and/or data connections from an external connection module 640, also provided on base frame 614, to the articulating arm. As mentioned previously, the articulating arm can contain one or more internal and/or external wired connections to receive and distribute power and/or data to various components of the presently disclosed omnidirectional locomotion system.

Power and data connections within the articulating arm can terminate into one or more conductive brushes 652, disposed on the lower portion 632 of the articulating arm such that the conductive brushes 652 maintain electrical contact with a corresponding one or more conductive traces or rings provided on slip ring 650. These conductive traces/rings on slip ring 650 are connected to the external connection module 640. In some examples, power and data are transmitted to and from the articulating arm through the contact patches formed between the conductive brushes 652 of the articulating arm and the conductive traces/rings on slip ring 650 of the base frame 614. In this manner, the articulating arm is free to rotate relative to the fixed base frame 614 and the slip ring 650 without interruption to any power or data connections of the articulating arm. As noted previously, in some embodiments power cables/components can be integrated with data cables/components, provided separately, or some combination of the two. Data can additionally be transmitted wirelessly, whether between components of the omnidirectional locomotion system and external transceivers, between different components of the omnidirectional locomotion system itself, or both. For example, the external connection module 640 can additionally include Bluetooth transceiver, a Wi-Fi transceiver, or one or more wireless transceivers implementing other wireless communication standards and protocols.

In light of the above discussion of FIGS. 6A-7B, it is appreciated that the concave outer shell of platform 612 conceals and protects the inner components of the base of the omnidirectional locomotion system. For example, the concave outer shell covers the supporting frame members 613, the rotation/Hall-effect sensors, and the power/slip ring 650 of the base. In some embodiments, base portion 610 of the omnidirectional locomotion system can include one or more steps to assist users in getting on and off of the base platform 612. The step can be attached to or otherwise integrated with the fixed base platform 612 and the fixed base frame 614. In some embodiments, the step can be rigidly fixed in place, e.g., remaining in a 'deployed' position. However, it is also possible that the step can be movable or stowable, for example provided on a hinge that allows the step to rotate from the 'deployed' position to a 'stowed' position underneath the base 610, such that in the stowed position the step is hidden from view by the outer shell of the base 610. However, it is also noted that additional clearance may be required in the rotation mechanism 620 in order to accommodate the bulk and/or height of the step within the interior volume of the base 610 while in the stowed position—for example, the rotation mechanism 620 and directly coupled segment 632 of the articulating arm might have a minimum clearance that interferes with the step in the stowed position. In some embodiments, rather than rotating about a hinge to move between the stowed and deployed positions, the step could instead move in a linear fashion, e.g., sliding horizontally along the ground to move in and out of the inner volume of the base portion 610. The step could be actuated mechanically or manually by the user, and/or could be actuated electrically, e.g., by one or more motors, servos, or solenoids within the base 610. It is noted that the position of the step, whether movable or not, can be used to indicate a 'front' of the omnidirectional locomotion system, by virtue of the fact that a user enters the omnidirectional locomotion system by using the step. As such, in a default or initial state, the step can be provided at an approximately 180° offset from the rotating articulating arm with respect to their positioning about the circumference of the base 610 of the omnidirectional locomotion system. In some embodiments, user engagement with the step can be sensed and used to turn on the omnidirectional locomotion system or otherwise initialize it for use by the user. Initialization of the omnidirectional locomotion system can include, but is not limited to, unlocking one or more of the locking mechanisms 124, 144 and 400 (e.g., rotation locking mechanisms)) that can be provided at one or more hinge joints of the articulating arm. For example, if the step can be moved between a stowed and deployed position, the omnidirectional locomotion system can be initialized in response to the step being moved to the deployed position. In some embodiments, an additional locking mechanisms (e.g., in or attached to the rotation mechanism) can lock rotation of the arm around the base (i.e., around the circumference of the base). Additionally, or alternatively, the step and/or platform 612 can include a load cell or other sensor(s) to detect when a user steps or stands on the step or platform 612—after detecting the user's weight/presence, the omnidirectional locomotion system can then be initialized for use. A sensor-based embodiment can be utilized independent of whether the step is movable between stowed and deployed positions or is permanently affixed to the base portion 610.

The disclosure turns now to a discussion of various example sensors that can be utilized by or in conjunction with the presently disclosed omnidirectional locomotion system in order to quickly and accurately measure user locomotion and related data. In some embodiments, there are at least three primary categories of user locomotion tracking that can be performed by the omnidirectional locomotion system and/or an associated VR computing device: tracking of the feet, tracking of torso orientation, and tracking of head and hand position. The below description is provided for purposes of example and illustration but is not to be construed as limiting in terms of sensor implementations that may be utilized in conjunction with the presently disclosed omnidirectional locomotion system.

With respect to tracking a user's feet, in some embodiments users can be provided with a sensor attachment for their shoes, where the sensor attachment(s) measure the movement of the user's feet or their "steps" as the user walks, runs, or moves on the omnidirectional locomotion system. For example, the sensor attachments can comprise one or more inertial measurement units (IMUs) or other inertial sensors generating inertial data that can be translated into user locomotion information. More particularly, the sensor attachments can incorporate IMUs and other inertial sensors in a 'pod' type design that is adaptable to fit over the shoes or footwear already being worn by the user of the omnidirectional locomotion system. See, for example, commonly owned U.S. Pat. Nos. 10,286,313; 10,635,162; 10,751,622; and U.S. patent application Ser. No. 16/395,776, the disclosures of which are herein incorporated in their entirety. It is also possible to track user locomotion, and in particular, movements of a user's feet by utilizing sensors provided within the base portion 610 of the omnidirectional locomotion system and/or sensors provided within the vicinity of the omnidirectional locomotion system and the user. Sensors such as these can be used in conjunction with inertial sensors worn on the user's feet and/or could be used in a standalone fashion. In some embodiments, the movement of a user's feet (e.g., user footsteps) could be tracked or detected by one or more sensors arranged underneath the surface of the concave platform 612 upon which the user stands. Sensors provided underneath the platform surface can include, but are not limited to, proximity sensors, capacitive sensors, pressure sensors, magnetic sensors, Hall-effect sensors, etc. In some embodiments, a combined Hall-effect sensor system or network can be utilized to track a user's feet/locomotion, in which the combined Hall-effect sensor network includes the previously described Hall-effect sensors for detecting rotation of the articulating arm relative to the base portion of the omnidirectional locomotion system and further includes the one or more Hall-effect sensors for tracking the user's feet/locomotion. In some embodiments, the same Hall-effect sensors (or a portion thereof) that are used to detect rotation of the articulating arm can also be used to track the user's feet/locomotion.

One or more optical sensors could also be used, in combination with one or more holes/slots in the platform surface, such that a relatively decreased amount of light falls on the optical sensor when the user's foot is planted on the platform and covering the hole, and a relatively increased amount of light falls on the optical sensor when the user's foot is lifted up off of the platform and ceases to cover the hole (e.g., when the user lifts his foot to take a step, the optical sensor registers an increase in brightness or light intensity). User locomotion and feet movement can also be tracked via one or more optical sensors that are arranged on the outside of the base portion 610 and/or the concave platform 612, e.g., in some embodiments by using a similar sensing logic as described above with respect to optical sensors underneath the base portion 610. In some embodiments, one or more optical sensors (and/or cameras) could be provided around the outside of the base portion 610 (or in the vicinity of the base portion 610/omnidirectional locomotion system) and use computer vision to discern or otherwise detect the user's locomotion and feet movements. It is further appreciated that various other implementations of optical tracking technology can be utilized without departing from the scope of the present disclosure.

With respect to tracking a user's body and/or torso orientation (and any rotation thereof), the omnidirectional locomotion system can utilize one or more Hall-effect sensors disposed within the base portion 610 (e.g., Hall-effect sensors provided on the circumference or perimeter of slip ring 650 to detect the angular position of the lower segment 632 of the articulating arm). Additionally, the omnidirectional locomotion system can utilize the previously described rotational sensors or encoders at the hinge joints of the articulating arm (e.g., sensors 128, 138 and 148) in combination with known geometry and dimensional information of the articulating arm, and thereby determine translational movements of the user and spine assembly to which the user is coupled via a vest or harness.

It is noted that the approach described above for tracking rotation operates under an assumption that the user's body orientation and related rotation/angular position is approximately equal to the rotation of the articulating arm—user rotation is either extrapolated from the sensed rotation of the articulating arm or is set equal to the sensed rotation of the articulating arm. In some embodiments, other sensors can also be utilized to detect the relative rotation or angular position of the articulating arm. For example, optical encoders, mechanical rotary encoders, etc. can also be used to detect relative rotation (and therefore user torso orientation and rotation) without departing from the scope of the present disclosure. In some embodiments, one or more inertial or gyroscopic sensors can be used to detect a user's torso orientation and rotation. For example, these inertial or gyroscopic sensors could be provided with the inertial sensors worn in a 'pod' that attaches to a user's shoes, could be integrated with the vest worn by the user and coupled to the attachment points on the spine assembly, etc. Inertial or gyroscopic sensors may also be provided in one or more of a VR headset worn by the user and/or one or more VR hand controllers held by the user, in which case inertial sensor data can be utilized from these sources as well. Furthermore, one or more optical sensors can be used to track the body orientation of a user. In some embodiments, these optical sensors can be the same as one or more of the optical sensors used to track a user's feet/locomotion. The optical sensors can additionally or alternatively be provided by one or more of the optical sensors used to track a user's hands (such as VR hand controllers) or head (such as a VR headset or standalone VR system). In some embodiments, one or more initialization readings might be acquired when a user first steps onto the omnidirectional locomotion system, such that the optical sensors can acquire a baseline reading and/or reference points that will be utilized to perform torso orientation tracking once the user begins to actively engage with and move within the omnidirectional locomotion system.

In some embodiments, a virtual reality headset used to provide a virtual reality environment to the user of the omnidirectional locomotion system can also provide measurements or indications of a user's locomotion, said measurements which can be used on their own or in combination with the sensor measurements and calculations described above. More particularly, a VR headset and/or one or more VR hand controllers held by the user can be utilized to track the position of the user's head and/or hands. For example, optical tracking can be performed by the VR headset to determine this information. In an "outside-in" optical tracking methodology, external optical sensors face the user on the omnidirectional locomotion system and detect the VR headset and VR hand controllers held by the user. From the outside reference point(s) used for optical tracking, three-dimensional coordinates can be calculated for the VR headset and hand controllers—and therefore the user's head and hands—in substantially real time. In an "inside-out" optical tracking methodology, optical cameras integrated with the VR headset face outward/away from the user and the omnidirectional locomotion system and can acquire one or more environmental reference points that provide a baseline for calculating the same three-dimensional real-time coordinates mentioned above. In either optical tracking scenario (outside-in or inside-out), the optical tracking can be augmented or refined by IMU data received from IMUs in the VR headset and VR hand controllers and/or from sensor data obtained from the omnidirectional locomotion system and corresponding to rotational or translational movement of the user and the articulating arm. Additionally, it is appreciated that in some embodiments the VR hand controllers (or other VR controllers) can utilize electromagnetic tracking, which can also be aided by IMU sensor data.

The VR headset and VR hand controllers couple with a VR computing device in order to perform one or more of the measurements and calculations described above, and more generally speaking, in order to provide the user of the omnidirectional locomotion system with interactivity with a VR environment. In some embodiments, the presently disclosed omnidirectional locomotion system can utilize a standalone VR headset with an embedded processor and other necessary computing hardware—in other words, the VR headset and the VR computing device can be the same, and no external computing device is needed. To support the computational needs of a standalone VR headset, the omnidirectional locomotion system can provide the VR headset with tethered power (e.g., the VR headset plugs into an appropriate power connector provided on the omnidirectional locomotion system) and/or the VR headset can be battery powered and the omnidirectional locomotion system can provide a charging station or receptacle to charge the VR headset when needed or when not in use.

Some users may desire the freedom offered by having no tethers connecting to their VR headset, in which case the standalone VR headset can be battery powered (which could be supplemented by wireless charging or wireless power from the omnidirectional locomotion system) and equipped with a wireless antenna or transceiver for wireless communication between one or more of the standalone VR headset, VR hand controllers, VR accessories or additional controllers, and the omnidirectional locomotion system. For example, wireless communication could be provided via Bluetooth, WiFi, or any other suitable wireless communication standard or protocol without departing from the scope of the present disclosure. The omnidirectional locomotion system can also be wirelessly communicatively coupled to one or more VR computing devices in order to transmit sensor and locomotion data and/or receive adjustment commands (e.g., brake settings/commands for one or more of the components of the omnidirectional locomotion system, haptic or force feedback commands to apply a real-world force corresponding to a user's experience in the VR environment, etc.) The one or more VR computing devices can be provided in or integrated with the omnidirectional locomotion system, in the VR headset (i.e., a standalone VR headset), and/or as a computing device external to the omnidirectional locomotion system and the user. It is further contemplated that the omnidirectional locomotion system can include one or more wired communication links coupling the omnidirectional locomotion system to the VR headset, VR controller(s), VR computing device(s), or any combination of the above, e.g., the omnidirectional locomotion system could be connected over USB to a VR computing device and the VR headset could also be connected to the same VR computing device over USB (or wirelessly).

As mentioned above, a VR computing device (or one or more portions/components of a VR computing device) can be integrated with, coupled to, or otherwise provided in conjunction with the presently disclosed omnidirectional locomotion system. For example, a VR computing device could be built into the omnidirectional locomotion system, and appropriate data (and power) connectors used to connect the user's VR headset to both the omnidirectional locomotion system and the integrated VR computing device within the omnidirectional locomotion system. In some embodiments, processing or computational load could be shared between a first VR computing device integrated with a standalone VR headset and a second VR computing device integrated with the omnidirectional locomotion system. Such load sharing could be supervised according to a variety of modes or user preferences, e.g., shifting greater computational load to an integrated VR computing device on the omnidirectional locomotion system in order to save battery life or increase charging speed of a user's standalone VR headset; or shifting more computationally complex elements to the integrated VR computing device of the omnidirectional locomotion system to provide better visual performance, framerate, resolution, etc. In some embodiments, a VR computing device can be removably attached to a receiver or holder on the omnidirectional locomotion system. Not only does such a design allow a user freedom of choice in selecting their VR computing device (or choosing not to use one at all, instead utilizing a standalone VR headset), but it also provides modularity and the ability for a user to upgrade his or her VR computing device as hardware improves or progresses. The omnidirectional locomotion system can provide a dedicated holder or receptacle (e.g., clip in tabs, an adjustable frame/holder, an embedded slot or volume, etc.) to receive a modular VR computing device and make appropriate power and data/sensor connections to the modular VR computing device once inserted or connected to the omnidirectional locomotion system.

Another consideration in the design of the base portion 610 is the need, in some scenarios, to lock the rotation of the base 610 in order to allow a user to more safely and easily get onto the omnidirectional locomotion system and attach themselves to the vest coupled to the spine assembly of the articulating arm. Accordingly, some embodiments can include one or more braking mechanisms to slow or arrest entirely any rotation of the articulating arm that might otherwise occur in the absence of the braking mechanism(s) being applied. In some embodiments, a disc or drum brake can be utilized at the hub or central rotation mechanism 620 between the fixed base platform 612 and the fixed base frame 614. It is also possible for a braking mechanism, including disc or drum brakes, to be provided away from the central axis of rotation of the rotation mechanism 620, e.g., a drum brake applied at or near the outer wall of the base portion 610, or a disc brake having a diameter only slightly smaller than the diameter of the base portion 610. The above scenarios contemplate a mechanical braking mechanism, but it is also possible for a powered braking mechanism to be used. For example, one or more motors could actuate a mechanical brake, or one or more motors could be used to directly oppose the rotation of the rotatable articulating arm of the omnidirectional locomotion system. In embodiments where one or more electric motors are already present (e.g., to provide a user with physical feedback corresponding to their actions/environment in the virtual reality world), the same motors can be used to provide a braking force for the articulating arm that supplements or replaces the braking force that would otherwise be provided by purely mechanical means.

Similar to the safety braking/locking mechanisms described previously with respect to the hinge joints of the articulating arm (e.g., locking mechanisms 124, 144, and/or 400), a safety braking mechanism could also be used to lock the articulating arm in a stationary position until a user is ready to begin using the omnidirectional locomotion system or is ready to enter a virtual reality environment. For example, the articulating arm can remain in a locked state (unable to rotate relative to the fixed base portion 610 or the ground plane) until it is triggered to unlock and allow rotation. This could be accomplished through purely mechanical means, wherein sufficient weight must be applied to the base (e.g., by a user standing on it) in order to engage the rotation mechanism 620 (e.g., user's weight causes the rotation mechanism 620 to drop into an alignment that permits rotation to occur). Similarly, a user might have to pull a safety lever, press a safety button, etc., in order to enable free rotation of the articulating arm of the omnidirectional locomotion system. In the locked position, the safety lever/button could cause one or more impediments to be placed in the path of rotation of the articulating arm, such as a pair of vertically oriented flanges or projections that block the rotating action of the articulating arm. In some embodiments, a mechanical safety brake mechanism can be provided separately from an adjustable braking mechanism that allows a user to adjust the ease with which the articulating arm rotates (e.g., a beginner user may want strongly damped rotation, while an expert user might want no damping or braking force to be applied after stepping onto the platform and removing the safety brake).

One or more sensors could also be used to control one or more of a safety braking force (e.g., locking out the rotation of the articulating arm and/or locking out the rotation of one or more hinge joints on the articulating arm while a user steps onto the platform and puts the vest on) and/or an adjustable braking force (e.g., controlling the degree to which the free rotation of the articulating arm is resisted in use). For example, a load cell in the base portion 610 can be configured to detect when a user steps on the platform 612 and could activate and deactivate the safety brake accordingly. In some embodiments, the weight of the user could automatically be used to determine an initial adjustable braking force (e.g., a lighter user would be configured for a weaker adjustable braking force than a heavier user, all else equal). As mentioned previously, such a load cell could also be located in the step attached to the base portion 610, in order to detect the presence of a user and lock out rotation of the articulating arm and/or one or more hinge joints of the articulating arm before a user actually steps onto the platform 612 of the omnidirectional locomotion system. In some embodiments, a mechanical lever arrangement could be integrated with the step, such that when a user puts his or her weight on the step, the lever causes a mechanical braking force to be applied.

Figure 8:
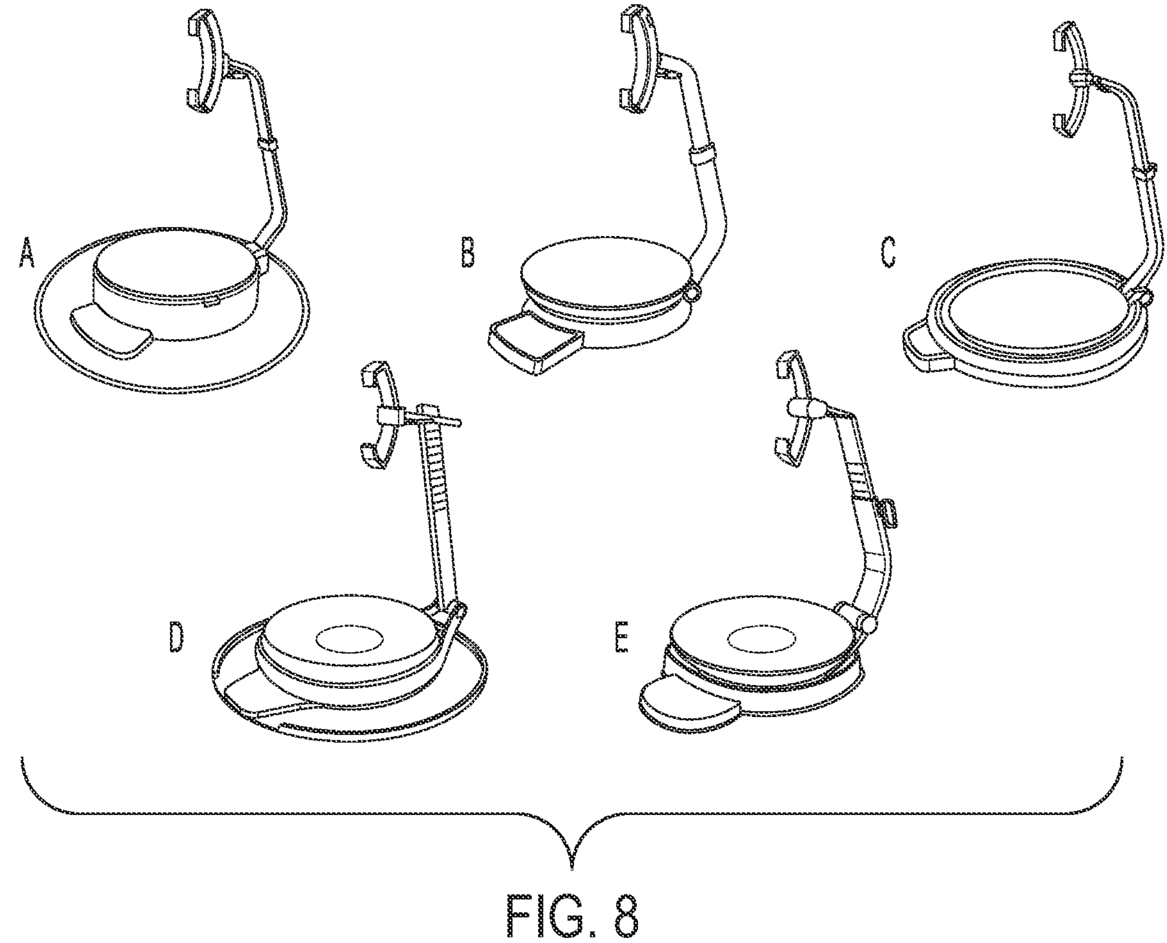
FIG. 8 depicts example deigns of an omnidirectional locomotion system according to one or more aspects of the present disclosure.

In some embodiments, braking control can be implemented in the VR software running on the VR headset associated with the omnidirectional locomotion system and worn by a user. In this scenario, one or more braking or locking mechanisms associated with the articulating arm can be electronically controlled (powered, for example, from the slip ring 650 in the base frame 614) such that rotation of the articulating arm is fully locked out as a user steps on, and is not released until the user sends a command or otherwise acknowledges that rotation of the articulating arm (and/or rotation of one or more hinge joints of the articulating arm) will be enabled, using for example an interface of the VR environment provided by the VR headset. Similarly, the adjustable braking force(s) associated with rotation of the articulating arm and/or the adjustable resistance force(s) associated with rotation of the hinge joints of the articulating arm can also be set up, configured, or otherwise adjusted using the same or a similar interface of the VR environment provided by the VR headset. Various examples of an omnidirectional platform according to aspects of the present disclosure are illustrated in FIGS. 8-19. For example, FIG. 8 illustrates five different omnidirectional platforms according to the present disclosure—labeled as 'A', 'B', 'C', 'D', and 'E'. The discussion below is made with reference to these various designs and their base components, and in particular the mechanism(s) by which the base components provide for and allow the relative rotation of the hinge/upper assembly/user attached to the omnidirectional platform by the vest.

Figure 9:
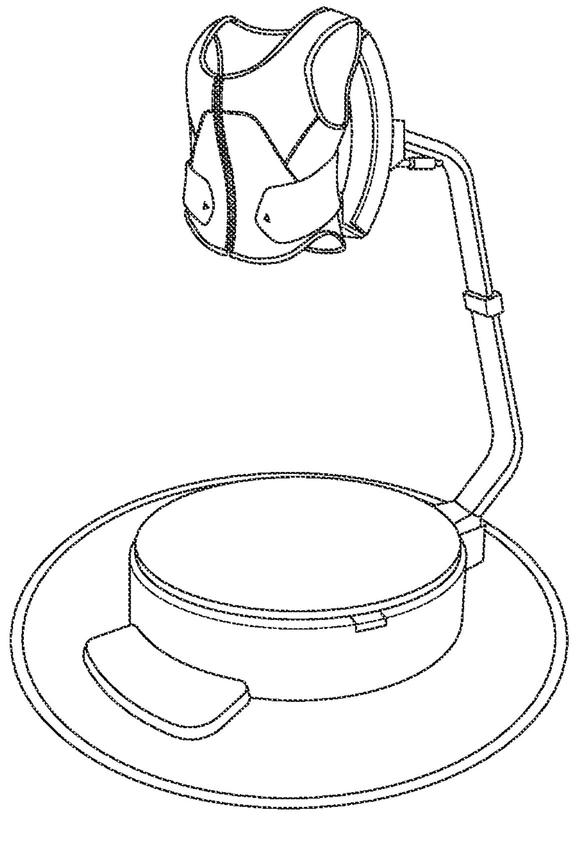
FIG. 9 depicts a first example omnidirectional locomotion system according to one or more aspects of the present disclosure.
Figure 10:
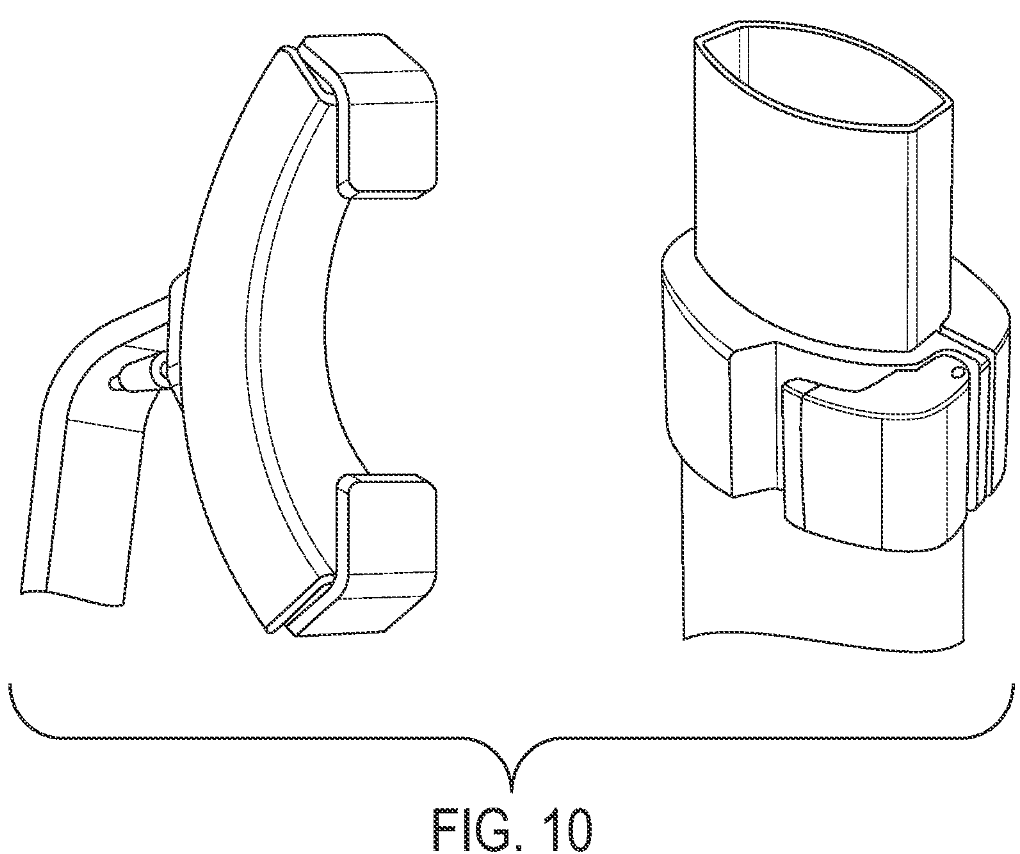
FIG. 10 depicts a first example view of an upper assembly and locking mechanism of an omnidirectional locomotion system according to one or more aspects of the present disclosure.

In FIGS. 9 and 10, the fixed base portion (which includes the concave shell upon which the user stands) is enveloped by a full height skirt, shown here as a fabric skirt. The full height skirt is included in the rotating portion of the base and the hinge mechanism is integrated with/hidden by the outer cover of the full height skirt. In operation, the full height skirt and integrated hinge rotate freely around the inner, fixed base. Accordingly, the maximum height of the step is less than the minimum height of the hinge integrated into the skirt, such that the bottom face of the hinge has sufficient clearance to rotate over the top of the step. Although the skirt is shown as a full height skirt, it is appreciated that various other skirt heights can be used, so long as sufficient clearance is maintained between the top of the step and the bottom of the hinge. Additionally, the hinge is shown as being approximately flush with the top edge of the skirt—in some embodiments, the hinge can be positioned above or below the top edge of the skirt.

In some embodiments, the omnidirectional platform of FIGS. 9 and 10 can be provided with a tight clearance between the outer diameter of the central fixed base and the inner diameter of the full height skirt, i.e., such that the extent of the open channel between the two is minimal. Braking forces can be applied to slow or resist the rotation of the skirt/hinge/upper arm assembly/user by a frictional braking mechanism between the central fixed base and the full height skirt. For example, a number and/or surface area of contact patches between the two could be increased in order to provide a stronger braking force and could be decreased to provide a weaker braking force. Braking components could extend from the outer surface of the central fixed base to make contact with the full height skirt, or braking components could extend from the inner surface of the full height skirt to make contact with the central fixed base, or some combination of the two. In some embodiments, one or more braking components could be vertically inserted into the channel between the central fixed base and the full height skirt in order to provide a braking force, e.g., with a greater insertion corresponding to a greater braking force. A vertically actuated braking component could have a substantially constant diameter or could have a variable diameter to provide a variable braking force as needed. Braking forces could additionally or alternatively be provided at a central rotating hub or bearing where the central fixed base and the full height skirt are coupled (e.g., such as the central hub seen in FIGS. 6A-7B).

As illustrated, the arm component can consist of an upper and lower portion, where both are hollow such that the upper portion can slide in and out of the lower portion in order to provide height adjustment to users of the omnidirectional platform—the upper portion of the arm is extended from the lower portion in order to set a larger height, and is inserted into the lower portion in order to set a smaller height. The relative position/extent of the upper and lower portions of the arm can be set via a quick release clamp, where a user loosens the clamp and makes the desired height adjustment, and then tightens the quick release clamp to lock the upper and lower portions of the arm into the desired height.

The spine component can be provided with a fabric cover over its mechanical components and to provide an enhanced aesthetic look. As illustrated, one or more gas shocks can be provided between the spine and arm components, where a force applied by the gas shock(s) is configured to support the weight of spine component (and in some embodiments, an attached vest) while in a resting position. In other words, the gas shock(s) apply a force designed to maintain the spine in a vertical or upright position with respect to the ground, instead of allowing the spine component to rotate under the force of gravity/its own weight, as might otherwise occur. In some embodiments, the force applied by the gas shock(s) can be adjustable, e.g., to provide different resistance levels to different users, according to factors such as user experience and user weight. The spine component can include one or more constant force springs that counteract the weight of the spine component (and in some embodiments a vest attached to the spine), such that in the resting position the spine component is approximately vertically centered with respect to its attachment point to the arm. In some embodiments, the resting position of the spine can be configured such that ⅔ of its vertical height is above the arm attachment point and ⅓ of its vertical height is below the arm attachment point. In some embodiments, the constant-force springs can be adjustable, e.g., to provide different resistance levels to different users, according to factors such as user experience, as a novice user might prefer a greater resistance level to provide dampening to their vertical movements, whereas an expert user might prefer that no additional resistance be provided (beyond the spring force counteracting the weight of the spine assembly and vest themselves).

Figure 11:
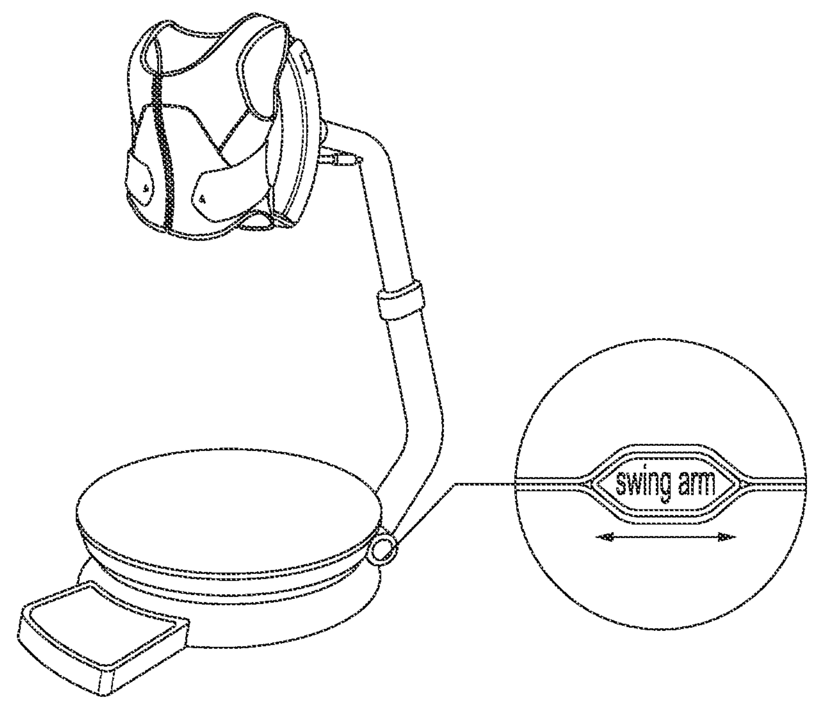
FIG. 11 depicts a second example omnidirectional locomotion system according to one or more aspects of the present disclosure.
Figure 12:
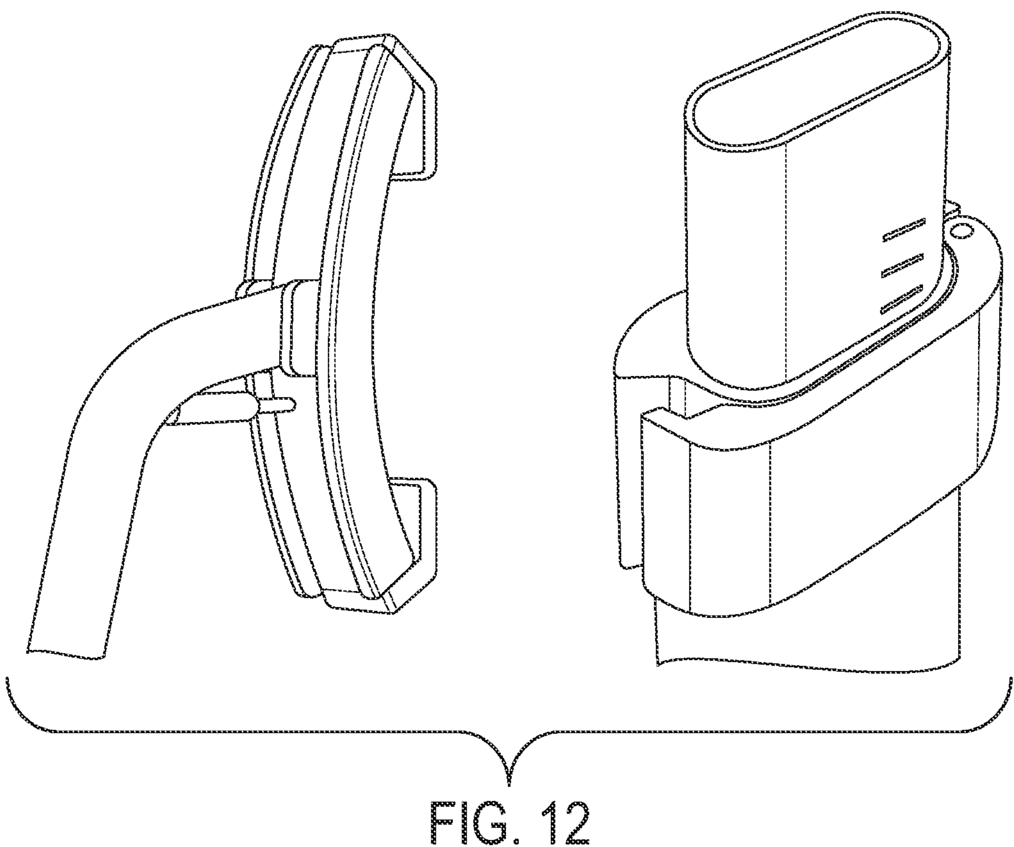
FIG. 12 depicts a second example view of an upper assembly and locking mechanism of an omnidirectional locomotion system according to one or more aspects of the present disclosure.

In FIGS. 11 and 12, a concave skirt is provided as part of the fixed base portion, while the hinge attaches to a rotation mechanism contained within an inner volume defined by the concave skirt. For example, as illustrated, a swing arm couples to the interior rotation mechanism and projects through a seal in the concave skirt (e.g., the seal might be provided by rubberized or other low-friction coatings on the open ends of the upper and lower skirt portions). As the swing arm rotates, the seal between the upper and lower skirt portions opens to accommodate the swing arm and then closes behind the swing arm as the rotation continues. In some embodiments, the swing arm and hinge can be configured such that the hinge is approximately flush with the outer surface of the concave skirt, although it is also possible for the hinge to project beyond the outer surface of the concave skirt. A step is shown integrated with the lower portion of the concave skirt, and it is contemplated that a maximum height of the step is less than a minimum height of the hinge. In some embodiments, the fixed platform upon which the user stands (i.e., the uppermost portion of the base) can have a greater diameter than the central portion of the concave skirt where the hinge is positioned. Therefore, the hinge can remain low-profile or even hidden from view when viewing the omnidirectional platform from the top down, by adjusting the concavity of the fixed concave skirt.

As illustrated, the arm can be provided as a two-piece, hollow tubular construction having an elliptical cross-section. As was described previously, the upper arm portion can slide in and out of the lower arm portion in order to provide height adjustment to a user. Markings indicating different height adjustments can be indicated on an outer surface of the upper arm portion, e.g., denoting height in increments of one inch. A low-profile, long clamp lever can be used to permit user adjustment and then lock the upper and lower arm portions into the user's desired height.

The spine component can comprise two rails disposed on the rear of the spine (away from the attachment point(s) for the user's vest. A roller or other suitable mechanism can couple the upper arm between the two rails of the spine, thereby permitting the spine to move vertically. As discussed previously, one or more gas pistons can be used to hold the spine/vest in a resting upright position and avoid tilting at the spine hinge, and one or more constant-force springs can be used to counteract the weight of the spine/vest and hold the spine in a halfway or other desired resting position and avoid the spine being pulled down to its maximal extent due to its own weight.

Figure 13:
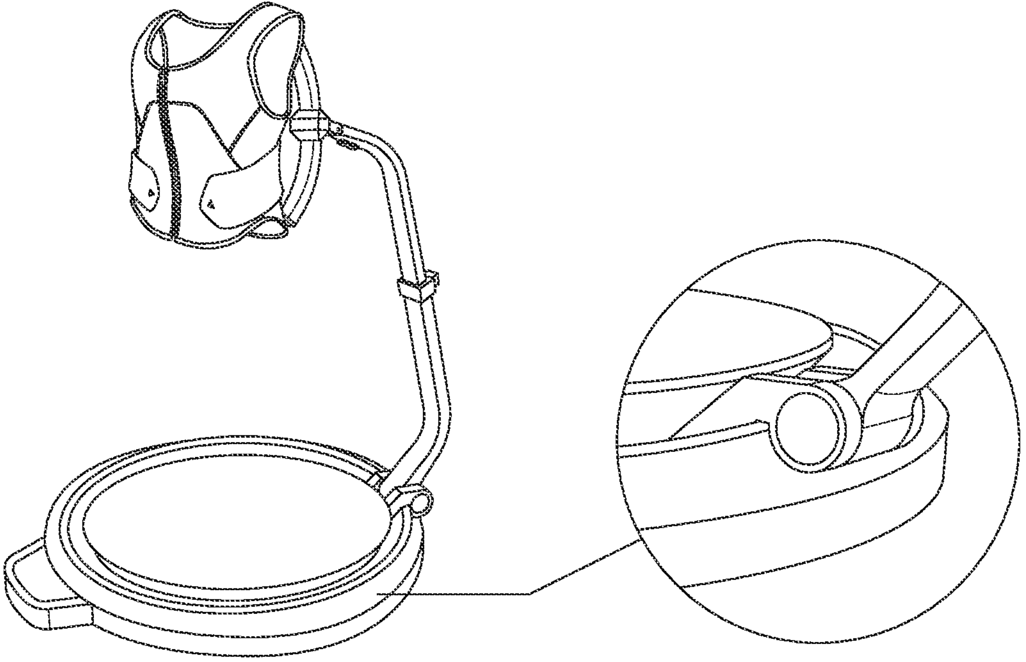
FIG. 13 depicts a third example omnidirectional locomotion system according to one or more aspects of the present disclosure.
Figure 14:
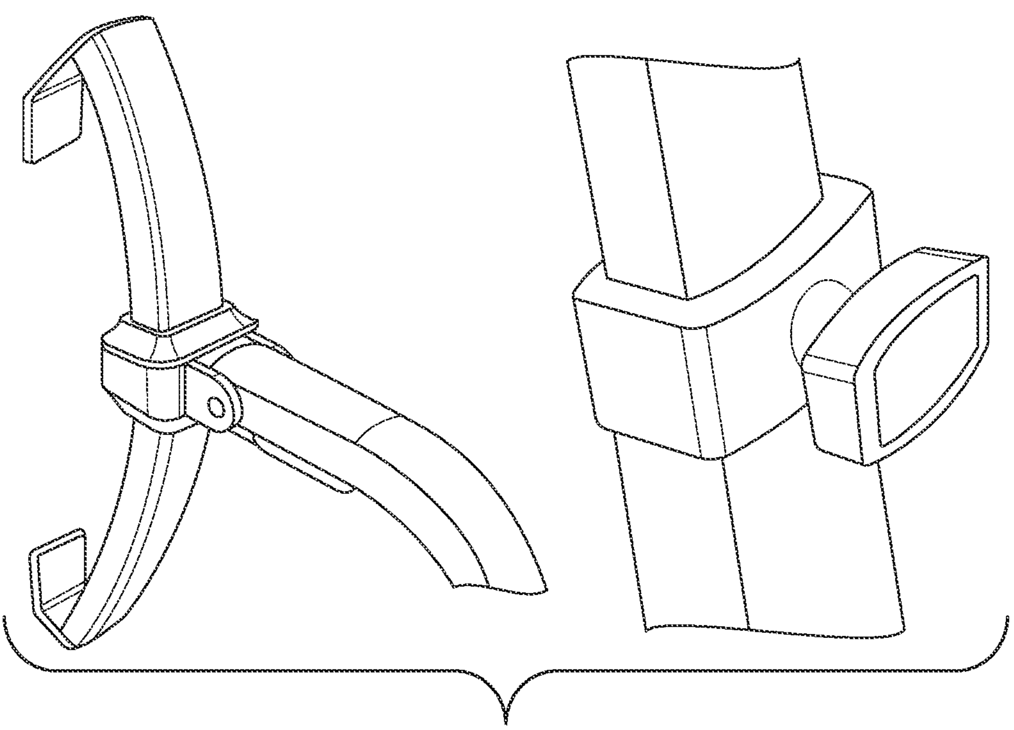
FIG. 14 depicts a third example view of an upper assembly and locking mechanism of an omnidirectional locomotion system according to one or more aspects of the present disclosure.

In FIGS. 13 and 14, a fixed side skirt can be integrated with the inner base platform upon which the user stands, such that a channel is formed between the side skirt and the inner base through which the hinge can travel/rotate. As illustrated, the channel can be angled, meaning that the inner base platform can be taller than the fixed side skirt, thereby forming an angled channel therebetween. The hinge is coupled to the rotation mechanism inside of/in the center of the base via a swing arm that extends through the angled channel. In some embodiments, the outer lip of the channel (i.e., on the outer surface of the fixed side skirt) can be contoured to the profile of the hinge, to provide a sleeker look and tighter clearances. The hinge can be aligned with the maximum outer diameter of the fixed side skirt or can be larger or smaller than the outer diameter of the fixed side skirt. In some embodiments, braking can be provided by engaging one or more of the swing arm and the hinge base with the channel. For example, the swing arm or hinge base could be brought into contact with the fixed side skirt, e.g., along the hinge contour. Braking could also be accomplished at the rotation mechanism, inside of the base.

As illustrated, the arm component can be provided as a hollow, two-piece tubular construction as described above, but with a quick release lever actuated by a screw-type or rotating handle. For example, a user could turn the handle counterclockwise to loosen the clamp and adjust the height of the arm as desired, and then turn the handle clockwise in order to tighten the clamp and fix the arm into the desired height. The spine component can be provided with a unibody construction, wherein the outer surface of the spine rail is inserted into a receiving portion on the upper arm. A frictional force between the outer surface of the spine rail/component and the inner surface of the upper arm receiving portion can be adjusted as desired, either to compensate for the weight of the spine and vest and set a desired vertical starting position of the spine and/or to provide a user feedback level as desired. One or more gas pistons can be used to resist tilting of the spine component in a resting position, shown here coupled between the arm and the spine, beneath the hinge.

Figure 15:
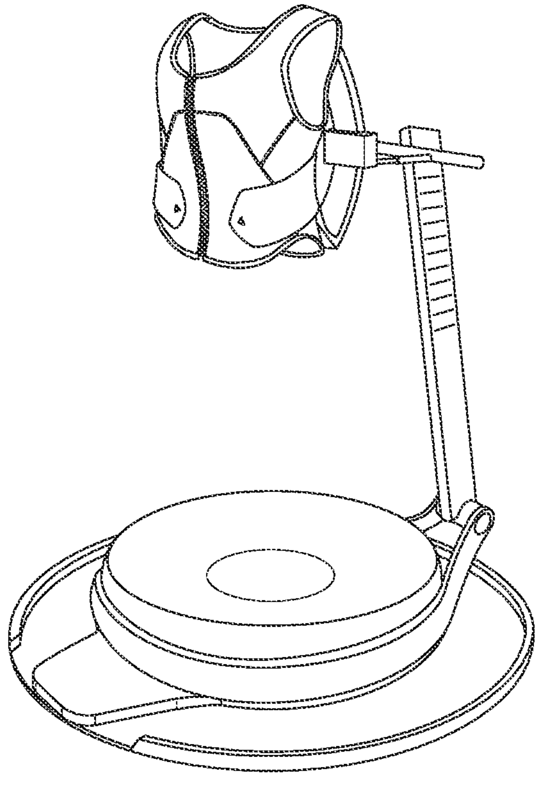
FIG. 15 depicts a fourth example omnidirectional locomotion system according to one or more aspects of the present disclosure.
Figure 16:
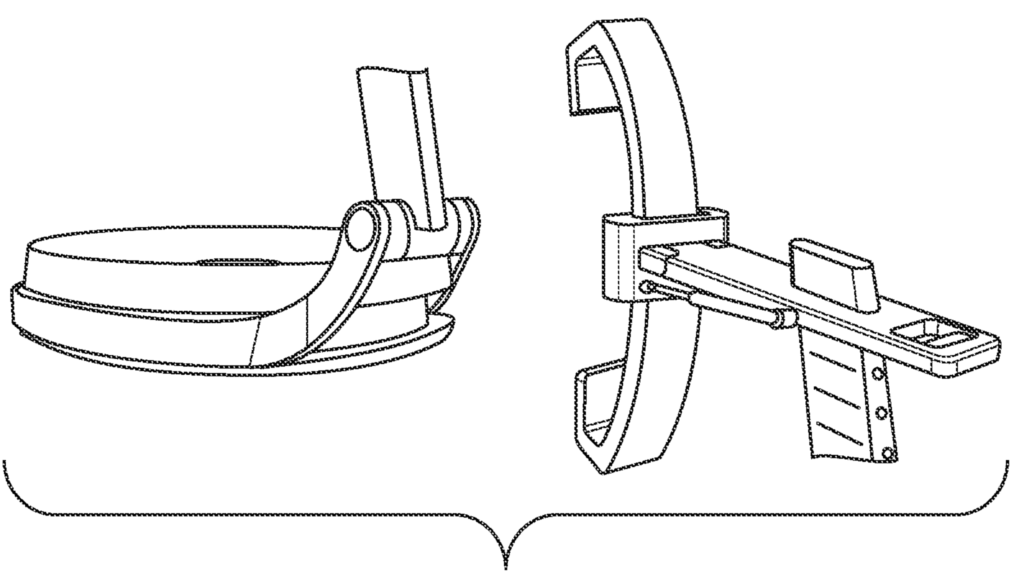
FIG. 16 depicts an example of a hinged base mechanism and a fourth example of an upper arm assembly of an example omnidirectional locomotion system according to one or more aspects of the present disclosure.

In FIGS. 15 and 16, the hinge is integrally formed with the skirt—both are included within the rotating portion of the base and rotate about the fixed inner platform upon which the user stands. Unlike in the designs discussed above, here the hinge can extend beyond the outer diameter both the inner fixed platform and the majority of the rotating skirt. The arm component can be provided as a hollow rectangular tube having a single piece (as opposed to the two or more-piece constructions discussed above). A user can perform vertical height adjustment by sliding a horizontal (or substantially horizontal) arm portion up and down along the vertical arm component. As illustrated, the vertical arm component can include markings indicating height increments or other pre-defined height adjustments that a user may find useful. A quick release trigger type mechanism can be provided at a distal end of the horizontal arm component (e.g., away from the spine attachment point), wherein actuation of the trigger releases the horizontal arm component and allows a user to perform height adjustment as desired, before then locking the horizontal arm component back in place at the desired height. Additionally, as seen in the detail view of FIG. 8B, the lower end of the vertical arm component can be integrated with or embedded in the hinge to provide a more robust and sturdy design.

Figure 17:
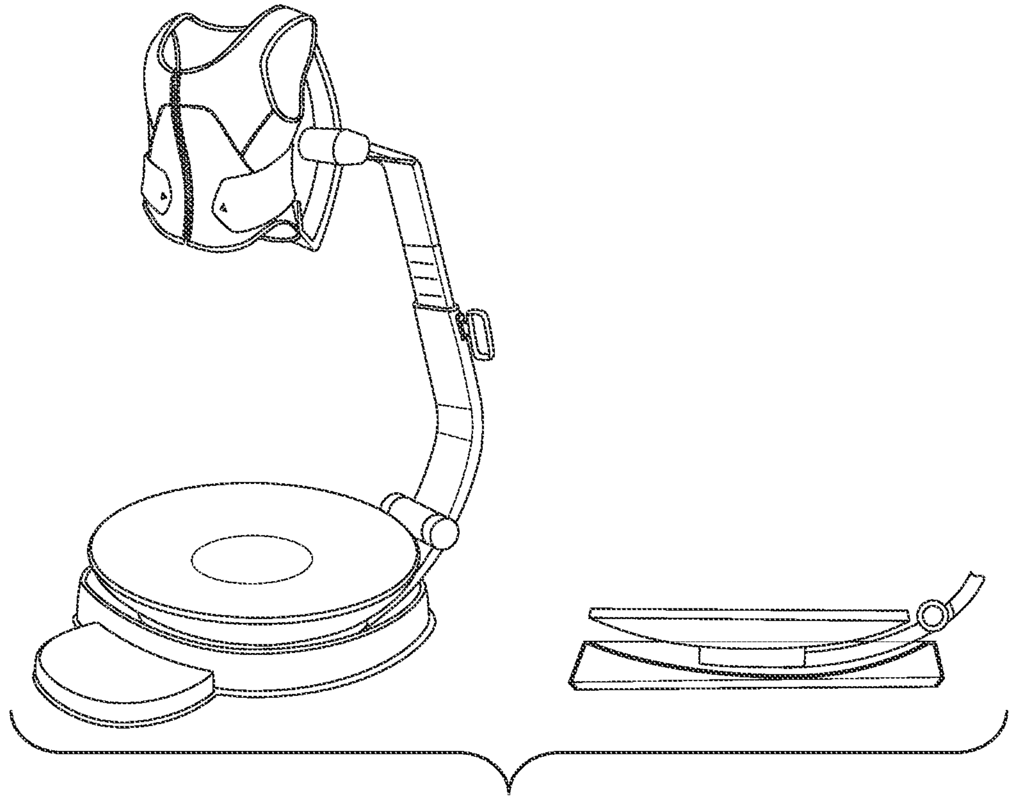
FIG. 17 depicts a fifth example omnidirectional locomotion system according to one or more aspects of the present disclosure.
Figure 18:
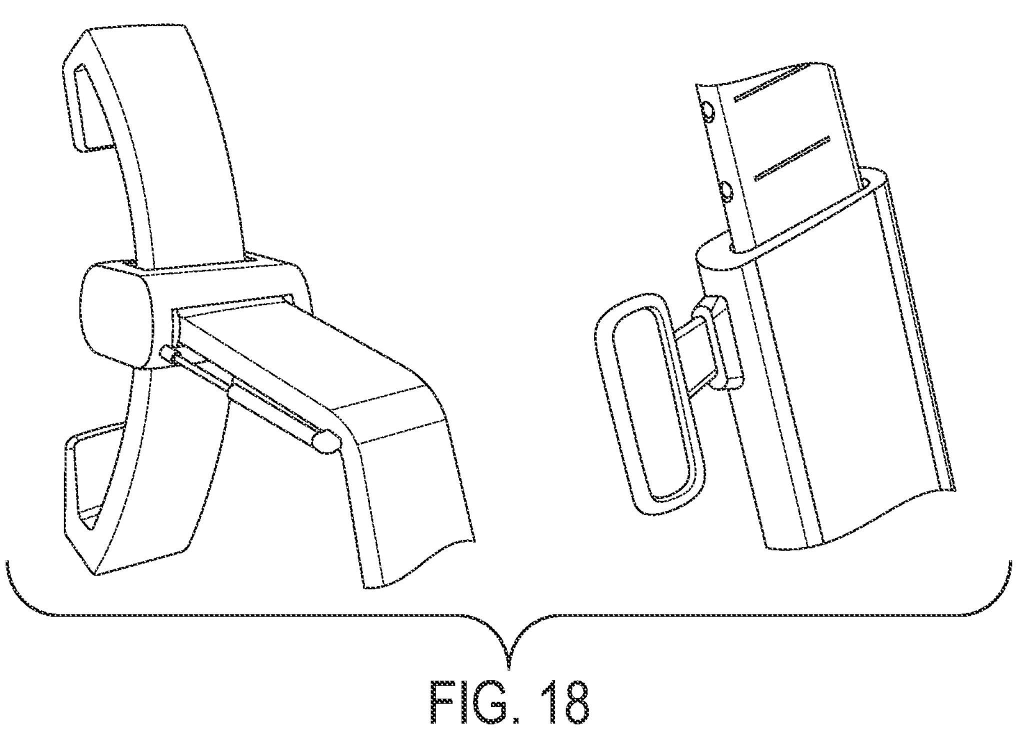
FIG. 18 depicts a fifth example view of an upper assembly and locking mechanism of an omnidirectional locomotion system according to one or more aspects of the present disclosure.
Figure 19:
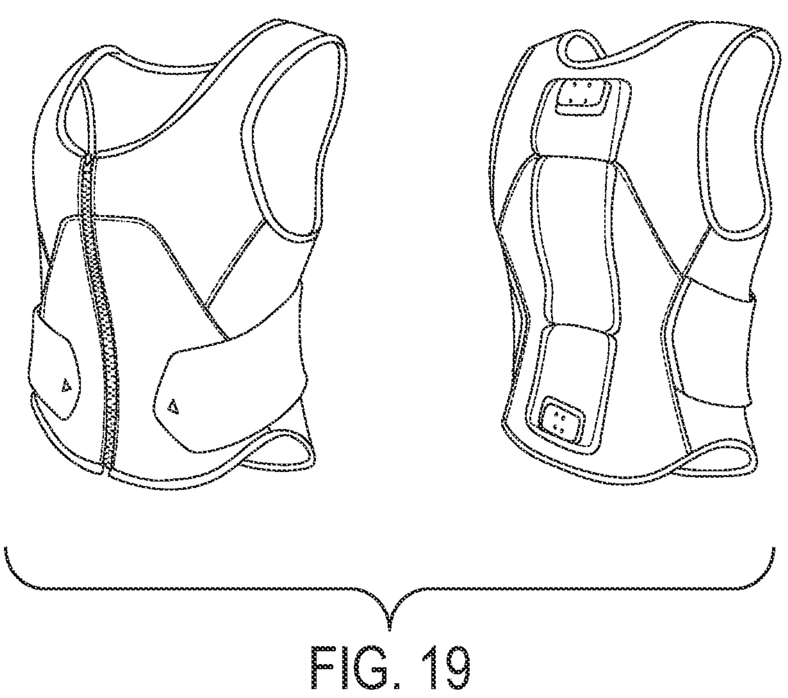
FIG. 19 depicts an example vet for use with an example omnidirectional locomotion system according to one or more aspects of the present disclosure.

In FIGS. 17 and 18, a fixed skirt and central inner platform upon which the user stands form a channel therebetween in which the hinge and upper assembly rotate. A swing arm extends between the rotation mechanism in the interior to the hinge on the exterior. As seen in the detail view of FIG. 17, the channel formed between the fixed skirt and the central inner platform can be concave or bowl-shaped in cross-section, and a correspondingly curved swing arm positioned in the channel. This can allow a sleeker, slimmer and more low-profile design, although the same constraint in which the hinge must be given sufficient clearance to pass over the top of the fixed step is still present. With respect to vertical adjustment of the arm component, a peg-type quick release handle (similar to that found and used to adjust gym equipment) can be used to move the arm component between different, pre-determined vertical heights. As seen in FIG. 18, the spine hinge and other spine components can be hidden inside of a covering shell portion at the attachment point between the spine and the upper arm.

What is claimed is:

1. An omnidirectional locomotion system comprising:

a base portion, the base portion including a platform configured to support a user; an articulating arm extending upward from the platform, the articulating arm comprising at least:

a first link;

a second link;

a harness support assembly coupled to the second link;

a first hinged joint coupled between the first link and the second link; and a second hinged joint coupled between the second link and the harness support assembly; and a rotation mechanism rotatably coupling the base portion to the articulating arm, wherein the articulating arm is rotatable about a complete outer circumference of the base portion.

2. The omnidirectional locomotion system of claim 1, wherein the harness support assembly having one or more attachment points, wherein the one or more attachment points couple the harness support assembly to a wearable user harness.

3. The omnidirectional locomotion system of claim 2, further comprising a sensor coupled to the first or the second hinged joint, wherein the first or the second hinge joint is configured to provide resistance in response to a reading from the sensor.

4. The omnidirectional locomotion system of claim 1, wherein the rotation mechanism includes a rotation locking mechanism.

5. The omnidirectional locomotion system of claim 1, wherein:

the first hinged joint is a revolute joint between a distal end of the first link and a distal end of the second link; and the hinged joint includes a rotation locking mechanism.

6. The omnidirectional locomotion system of claim 5, wherein the rotation locking mechanism comprises a first rotational component coupled to the distal end of the first link and a second rotational component coupled to the distal end of the second link, the rotation locking mechanism being actuatable to bring the first rotational component into contact with the second rotational component to prevent a relative rotation between the first link and the second link.

7. The omnidirectional locomotion system of claim 6, wherein the spring is adjustable, such that the spring is adjustable to provide a variable spring force.

8. The omnidirectional locomotion system of claim 1, further comprising a spring coupled to the first hinged joint, such that the spring applies a resistance force to rotation of the first hinged joint in a first direction and a restoring force to rotation of the hinged joint in a second direction, the second direction opposite of the first direction.

9. The omnidirectional locomotion system of claim 8, wherein the spring comprises a clock spring or a torsional spring.

10. The omnidirectional locomotion system of claim 9, further comprising a damper coupled to the same hinged joint as the spring, such that the resistance force comprises a combination of a spring force applied by the spring and a damping force applied by the damper.

11. The omnidirectional locomotion system of claim 1, further comprising a second spring coupled to the second hinged joint, such that the second spring applies a resistance force to rotation of the second hinged joint in a first direction and a restoring force to rotation of the second hinged joint in a second direction, the second direction opposite of the first direction.

12. The omnidirectional locomotion system of claim 11, wherein the second spring comprises a clock spring or a torsional spring.

13. The omnidirectional locomotion system of claim 11, wherein the second spring is adjustable to provide a variable second spring force.

14. The omnidirectional locomotion system of claim 1, wherein the base portion comprises an upper platform and a lower frame, the upper platform and lower frame rigidly coupled through an inner portion of the rotation mechanism.

15. The omnidirectional locomotion system of claim 14, wherein the articulated arm extends through a vertical separation between the upper platform and the lower frame and is coupled to an outer portion of the rotation mechanism, the outer portion of the rotation mechanism rotatable relative to the inner portion of the rotation mechanism.

16. The omnidirectional locomotion system of claim 1, further comprising:

a slip ring included in the base portion, the slip ring comprising one or more circular conductive traces; and one or more brushes disposed on the articulating arm, wherein the one or more brushes extend from the articulating arm to contact the one or more circular conductive traces of the slip ring.

17. The omnidirectional locomotion system of claim 16, wherein the one or more circular conductive traces of the slip ring are coupled to an electrical power supply or a data communication path.

18. The omnidirectional locomotion system of claim 17, wherein:

the articulating arm further comprises one or more of an electrical power distribution system and a data communication system; and the one or more electrical power distribution system and data communication system are coupled to the electrical power supply and data communication path via the contact between the one or more brushes and the slip ring.

19. The omnidirectional locomotion system of claim 1, further comprising one or more Hall effect sensors disposed in the base portion to determine an angular position of the articulating arm relative to the base portion.

20. The omnidirectional locomotion system of claim 1, further comprising one or more rotary sensors coupled to the hinged joint, wherein the one or more rotary sensors detect a relative rotation between the first link and the second link at the first hinged joint.

* * * * *